US009355515B2

(12) United States Patent
Brahami et al.

(10) Patent No.: US 9,355,515 B2
(45) Date of Patent: *May 31, 2016

(54) AUTOMATIC MOBILE COMMUNICATOR DEPOT SYSTEM AND METHODOLOGY

(71) Applicant: CELLOMAT ISRAEL LTD., Netanya (IL)

(72) Inventors: Rafi Brahami, Givatayim (IL); Hanan Samet, Emek Hefer (IL); Rafael Poran, Kochav Yair (IL); Meir Rabinovitch, Emek Hefer (IL); Itzik Chayon, Kfar Saba (IL); Roshel Borochov, Neve Yamin (IL); Ron Nabarro, Ra'anana (IL)

(73) Assignee: CELLOMAT ISRAEL LTD., Netanya (IL)

(*) Notice: Subject to any disclaimer, the term of this patent is extended or adjusted under 35 U.S.C. 154(b) by 0 days.

This patent is subject to a terminal disclaimer.

(21) Appl. No.: 14/277,908

(22) Filed: May 15, 2014

(65) Prior Publication Data
US 2014/0249668 A1 Sep. 4, 2014

Related U.S. Application Data

(63) Continuation of application No. 13/629,245, filed on Sep. 27, 2012, now Pat. No. 8,755,783.

(60) Provisional application No. 61/577,112, filed on Dec. 19, 2011.

(51) Int. Cl.
*H04W 24/00* (2009.01)
*G07F 7/06* (2006.01)
(Continued)

(52) U.S. Cl.
CPC ............... *G07F 7/06* (2013.01); *G07F 11/002* (2013.01); *G07F 17/40* (2013.01); *H04W 24/02* (2013.01)

(58) Field of Classification Search
CPC ... G06Q 30/0278; G06Q 10/00; G06Q 30/00; G06Q 50/00; H04W 24/02; H04W 1/0287; H04M 1/24
See application file for complete search history.

(56) References Cited

U.S. PATENT DOCUMENTS 4,951,308 A  8/1990  Bishop et al.
7,392,046 B2  6/2008  Leib
(Continued)

FOREIGN PATENT DOCUMENTS

WO      01/15096      3/2001
WO   2013/093902 A1   6/2013

OTHER PUBLICATIONS

An Office Action dated Sep. 5, 2013, which issued during the prosecution of U.S. Appl. No. 13/629,245.
(Continued)

*Primary Examiner* — Diane Mizrahi
(74) *Attorney, Agent, or Firm* — Sughrue Mion, PLLC

(57) ABSTRACT

An automatic mobile communicator depot system including a mobile communicator acceptor for accepting mobile communicators and providing mobile communicator acceptance inputs, a mobile communicator dispenser for dispensing substitute mobile communicators in response to substitute mobile communicator dispensing instructions, a customer interface receiving customer inputs identifying a specific mobile communicator with a specific customer, and a depot controller responsive at least to the customer inputs and the acceptance inputs and including dispenser control functionality for providing dispensing instructions to the mobile communicator dispenser to dispense a specific substitute mobile communicator to a specific customer and automatic telephone number transfer functionality for transferring a telephone number from a mobile communicator received by the mobile communicator acceptor from a given customer to the substitute mobile communicator dispensed by the mobile communicator dispenser to the customer.

27 Claims, 24 Drawing Sheets

(51) Int. Cl.
*G07F 17/40* (2006.01)
*G07F 11/00* (2006.01)
*H04W 24/02* (2009.01)

(56) References Cited

U.S. PATENT DOCUMENTS

| | | |
|---|---|---|
| 7,640,458 B2 | 12/2009 | Rao |
| 7,881,965 B2 | 2/2011 | Bowles et al. |
| 8,755,783 B2 * | 6/2014 | Brahami et al. ............ 455/418 |
| 2003/0073411 A1 | 4/2003 | Meade |
| 2003/0073412 A1 | 4/2003 | Meade |
| 2003/0073432 A1 | 4/2003 | Meade |
| 2005/0031206 A1 | 2/2005 | Kaneko et al. |
| 2008/0032789 A1 | 2/2008 | Walker et al. |
| 2008/0126261 A1 | 5/2008 | Lovett |
| 2009/0143103 A1 | 6/2009 | Chishti et al. |
| 2010/0228676 A1 | 9/2010 | Librizzi et al. |
| 2010/0235249 A1 | 9/2010 | Smith et al. |
| 2011/0047033 A1 | 2/2011 | Mahaffey et al. |
| 2012/0021820 A1 | 1/2012 | Gordon et al. |
| 2013/0016173 A1 | 1/2013 | Johnson et al. |
| 2013/0090996 A1 | 4/2013 | Stark |
| 2013/0124426 A1 * | 5/2013 | Bowles et al. ............ 705/308 |
| 2013/0157641 A1 | 6/2013 | Brahami et al. |
| 2013/0246285 A1 | 9/2013 | Chayun et al. |
| 2013/0311318 A1 * | 11/2013 | Librizzi et al. ............ 705/26.3 |
| 2014/0249668 A1 | 9/2014 | Brahami et al. |
| 2014/0295819 A1 | 10/2014 | Chayon et al. |
| 2014/0346185 A1 | 11/2014 | Chayun et al. |

OTHER PUBLICATIONS

Notice of Allowance dated Feb. 4, 2014, which issued during the prosecution of U.S. Appl. No. 13/629,245.
An International Search Report and a Written Opinion both dated May 28, 2013, which issued during the prosecution of Applicant's PCT/IL2012/000392.
An International Preliminary Report on Patentability dated Jun. 24, 2014, which issued during the prosecution of Applicant's PCT/IL2012/000392.
An Office Action dated Aug. 13, 2015, which issued during the prosecution of U.S. Appl. No. 14/367,108.
An Office Action dated Aug. 12, 2015, which issued during the prosecution of U.S. Appl. No. 14/305,328.
European Search Report dated Aug. 14, 2015, which issued during the prosecution of Applicant's European App No. 12858899.3.

* cited by examiner

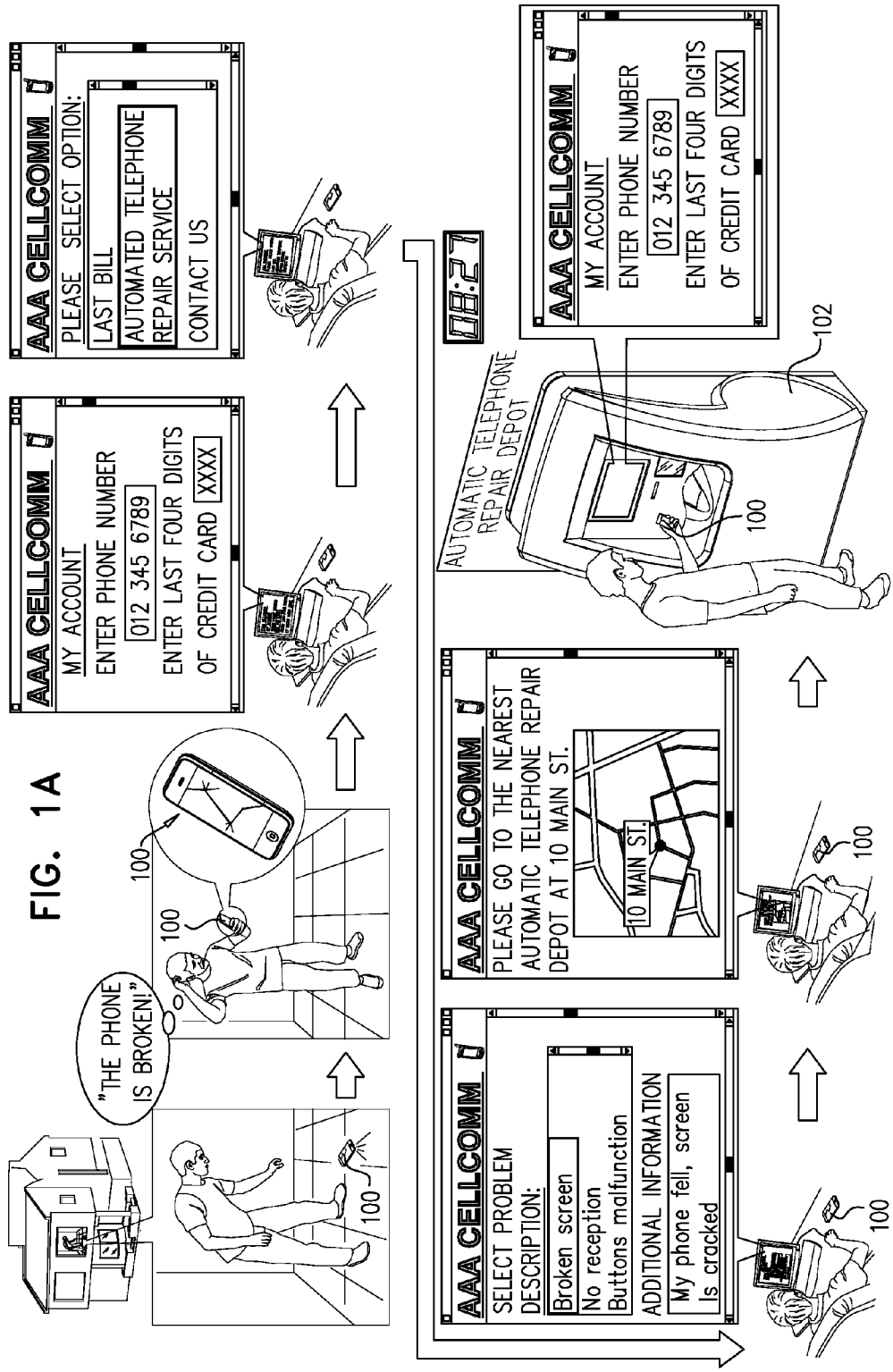

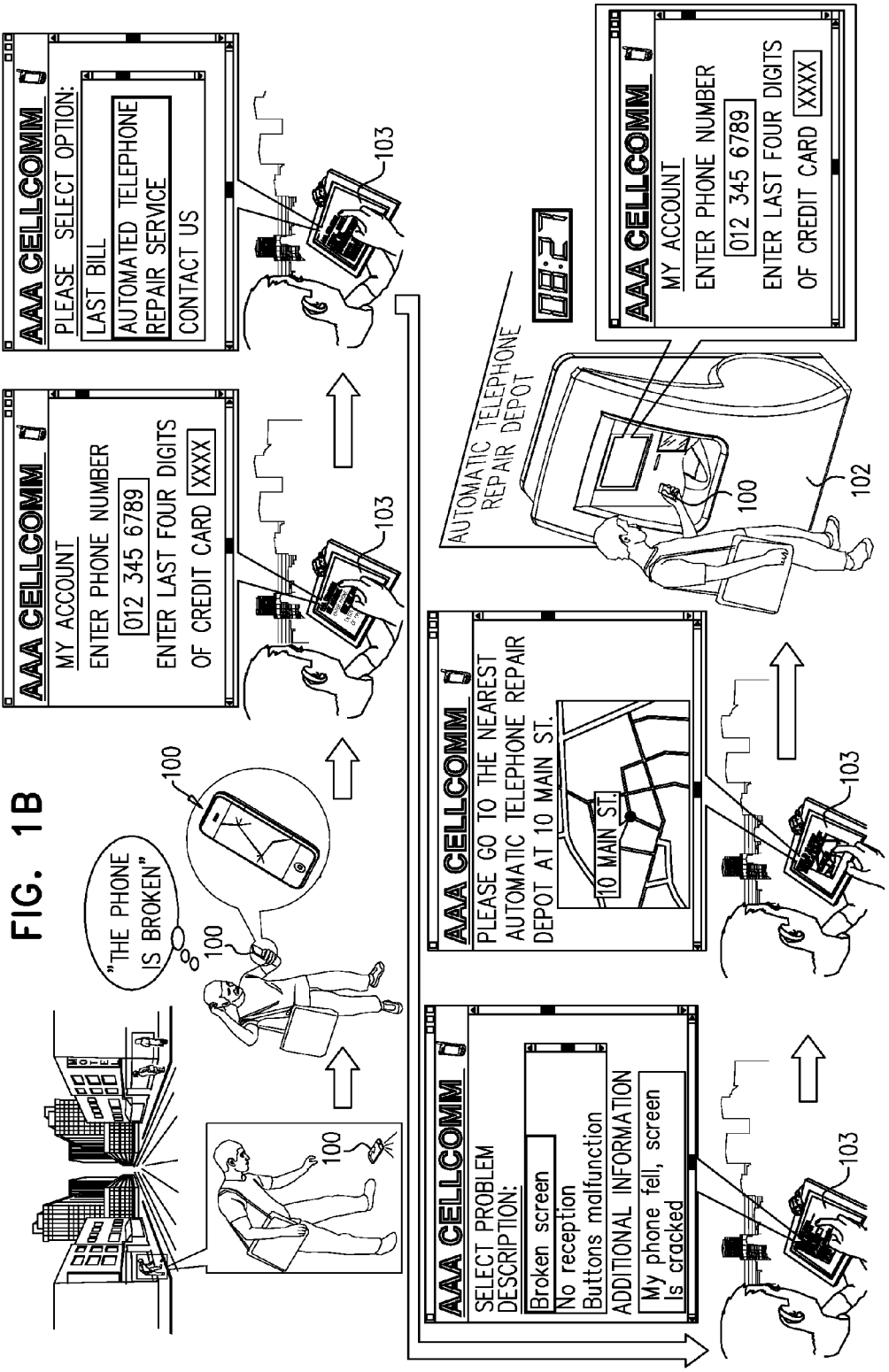

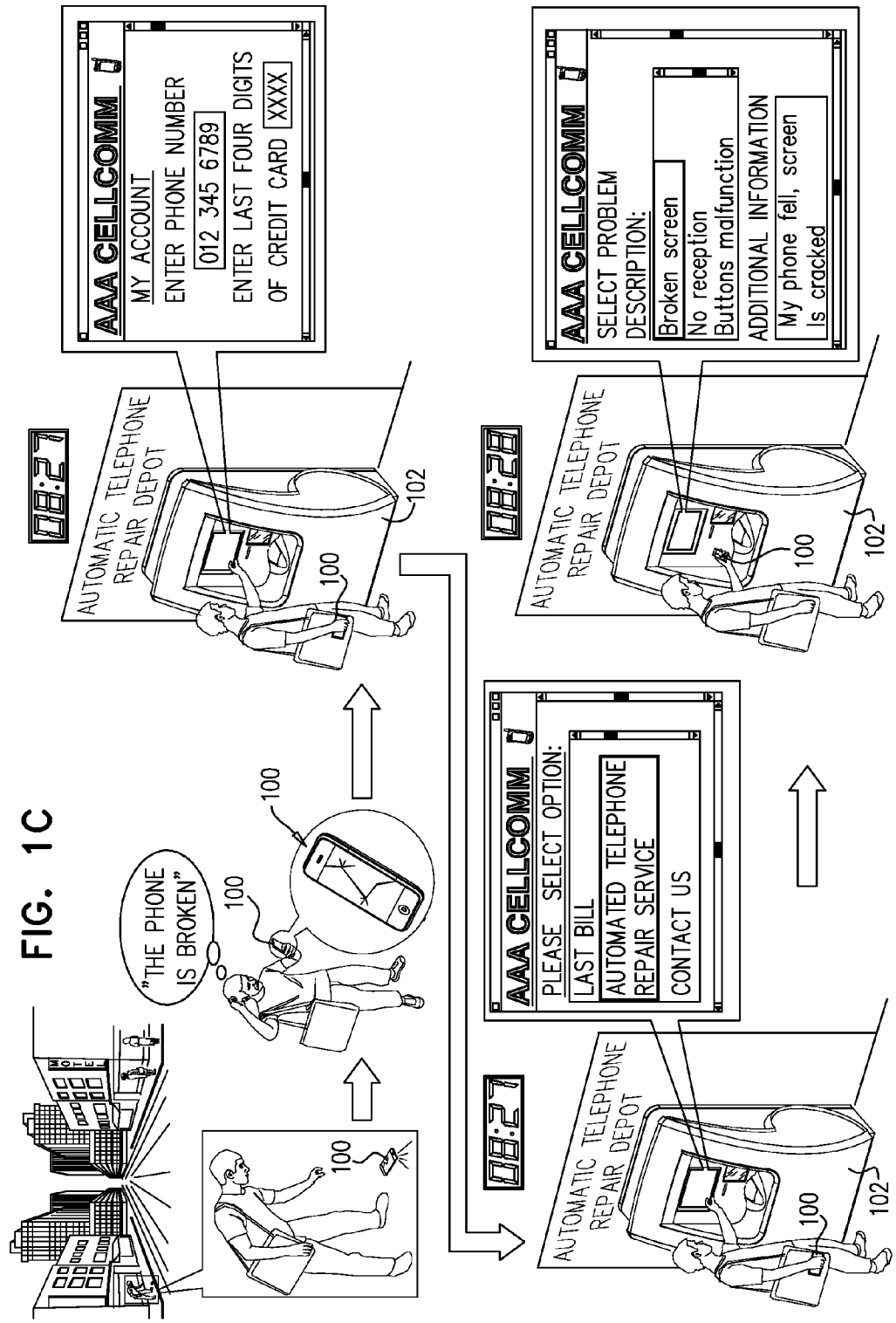

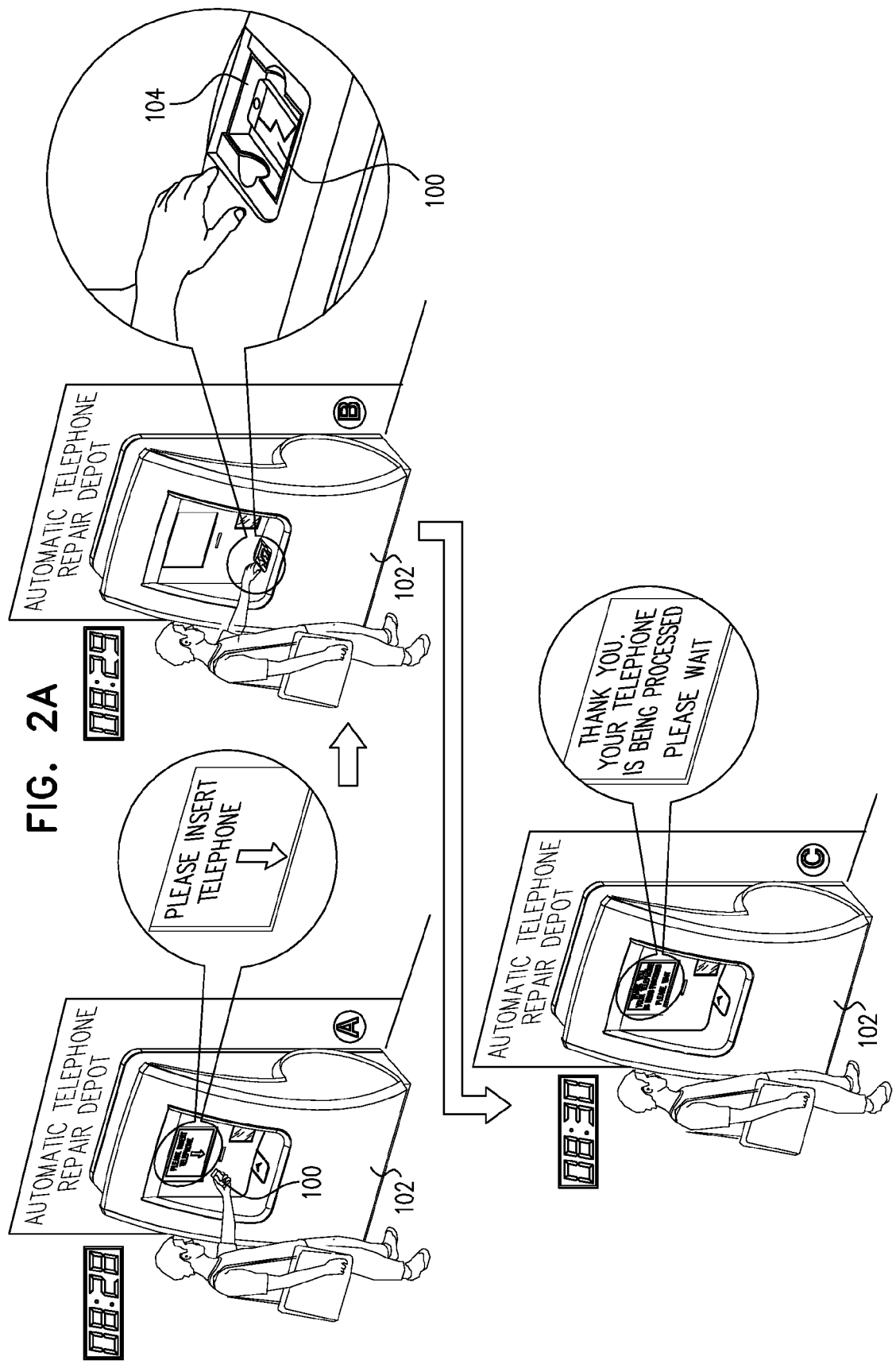

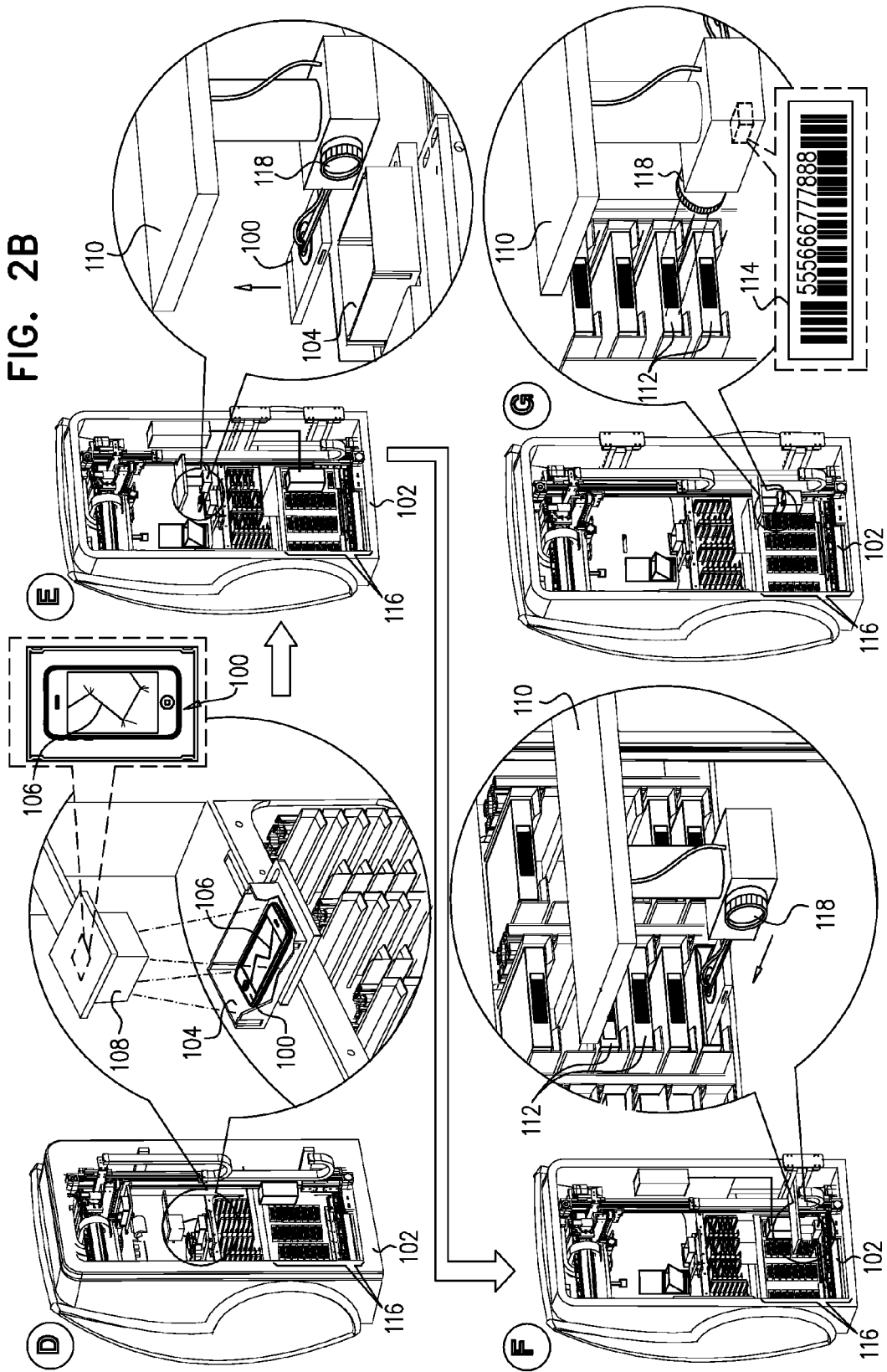

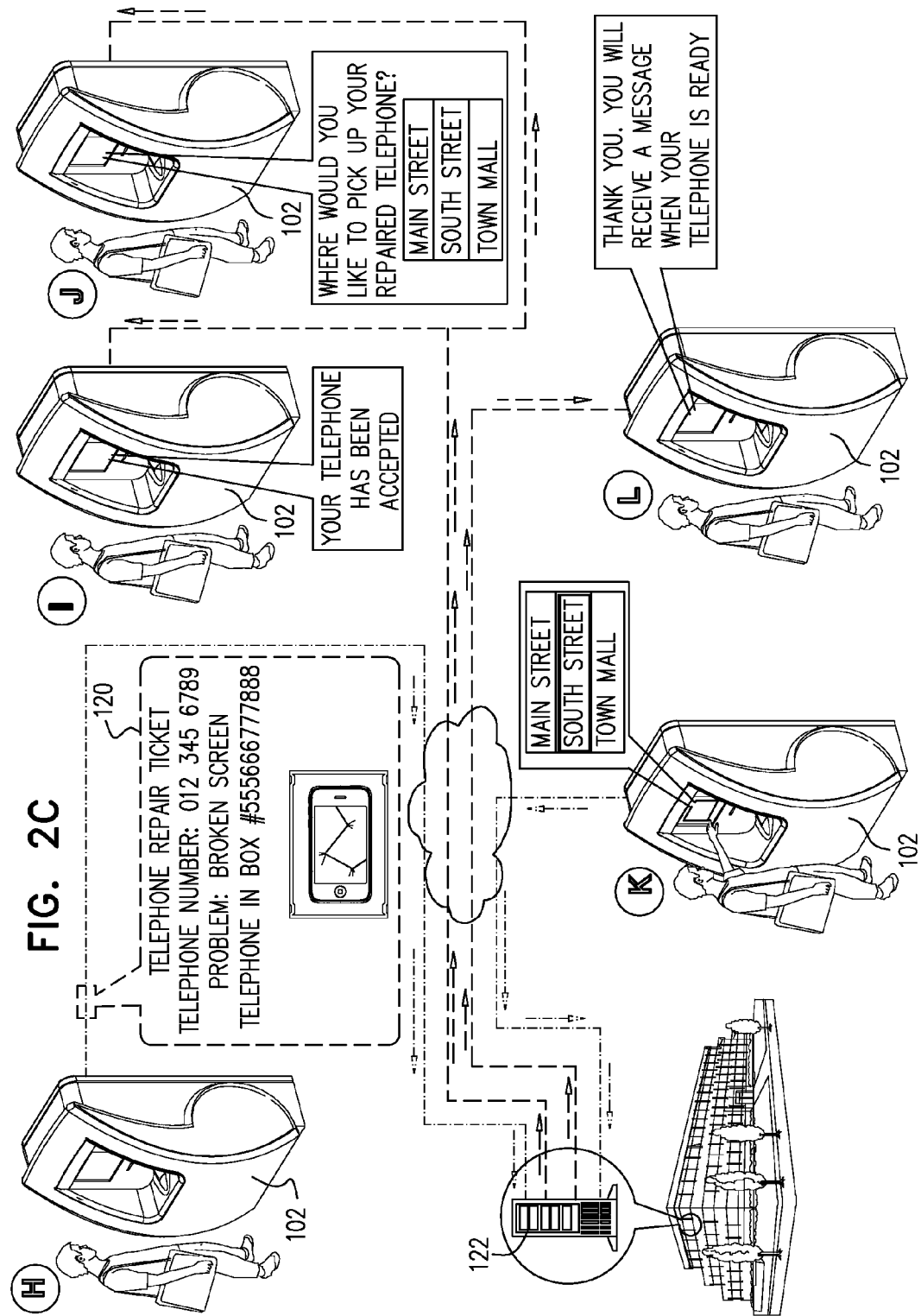

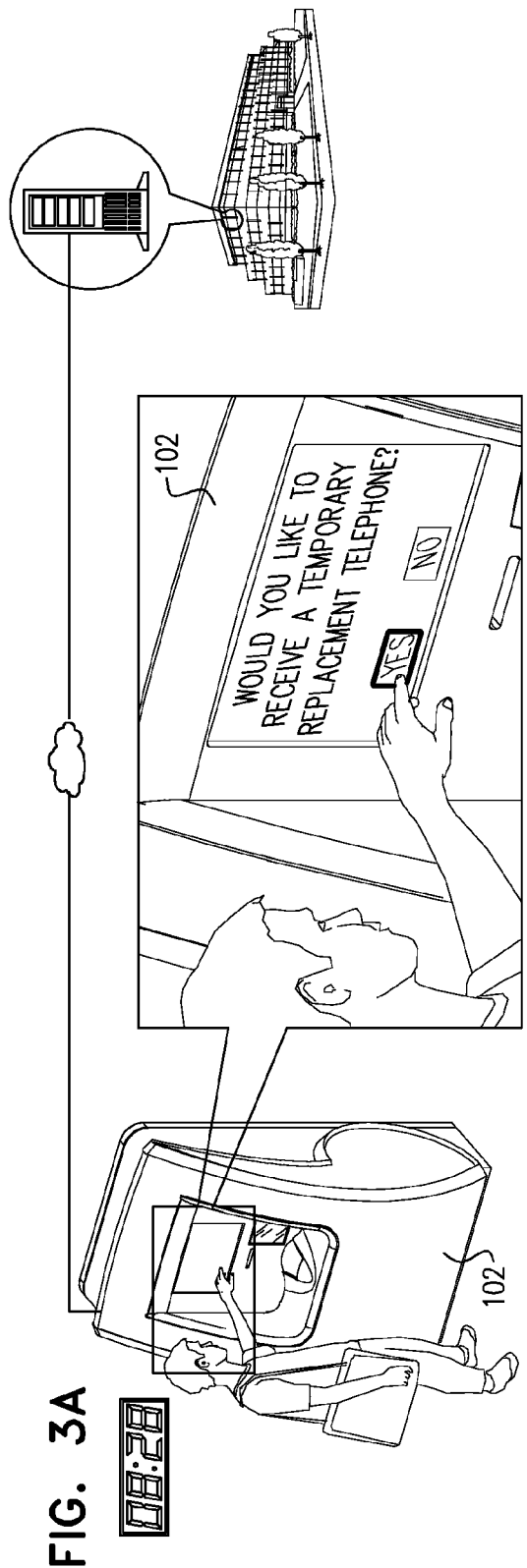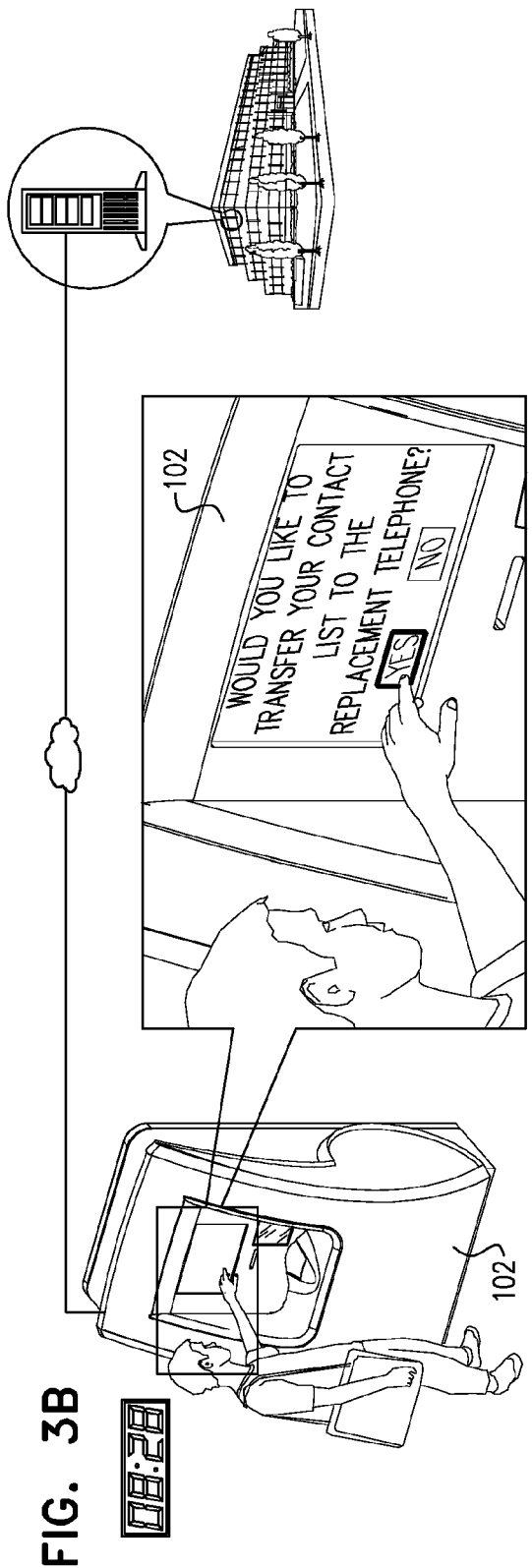

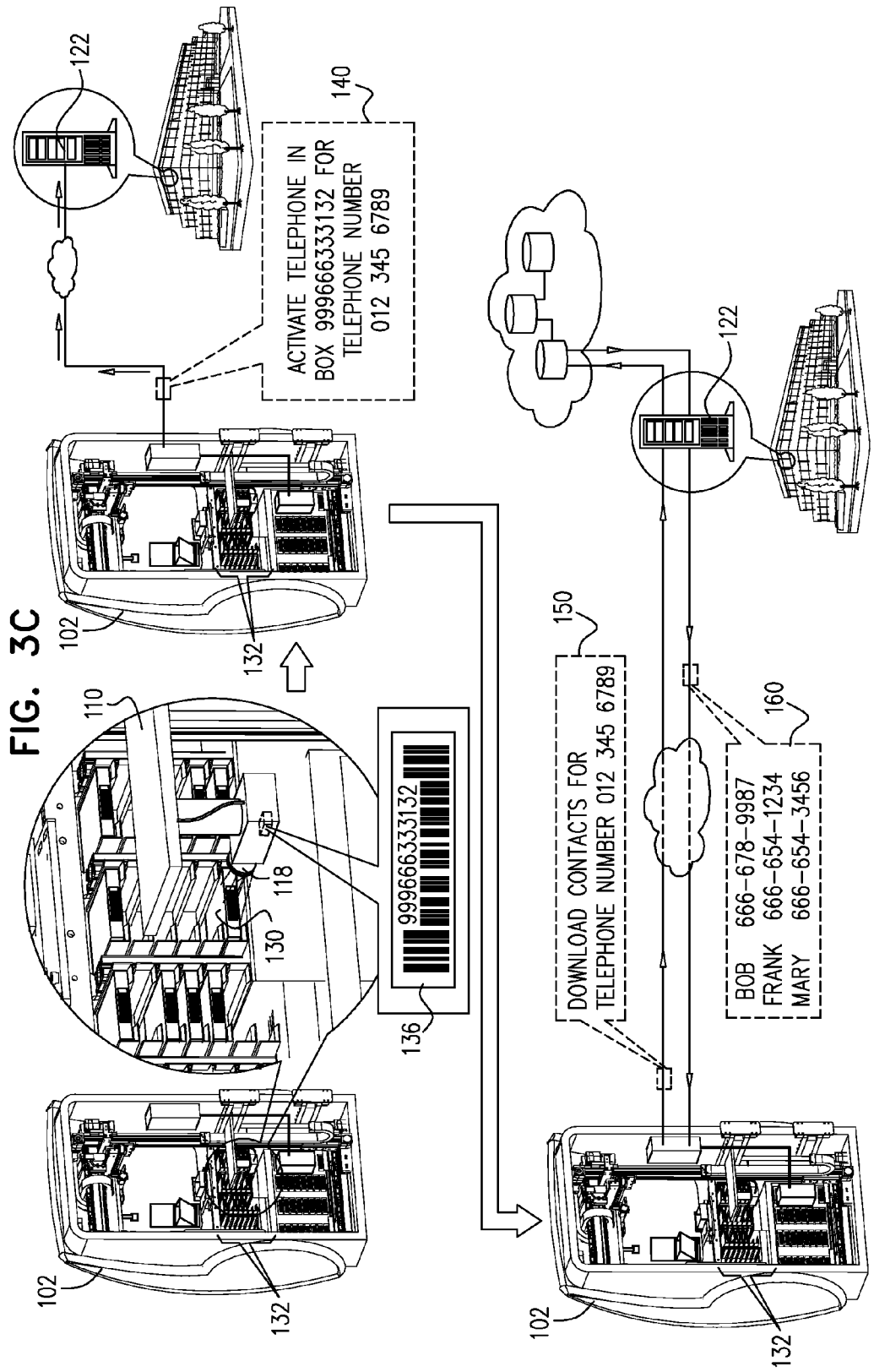

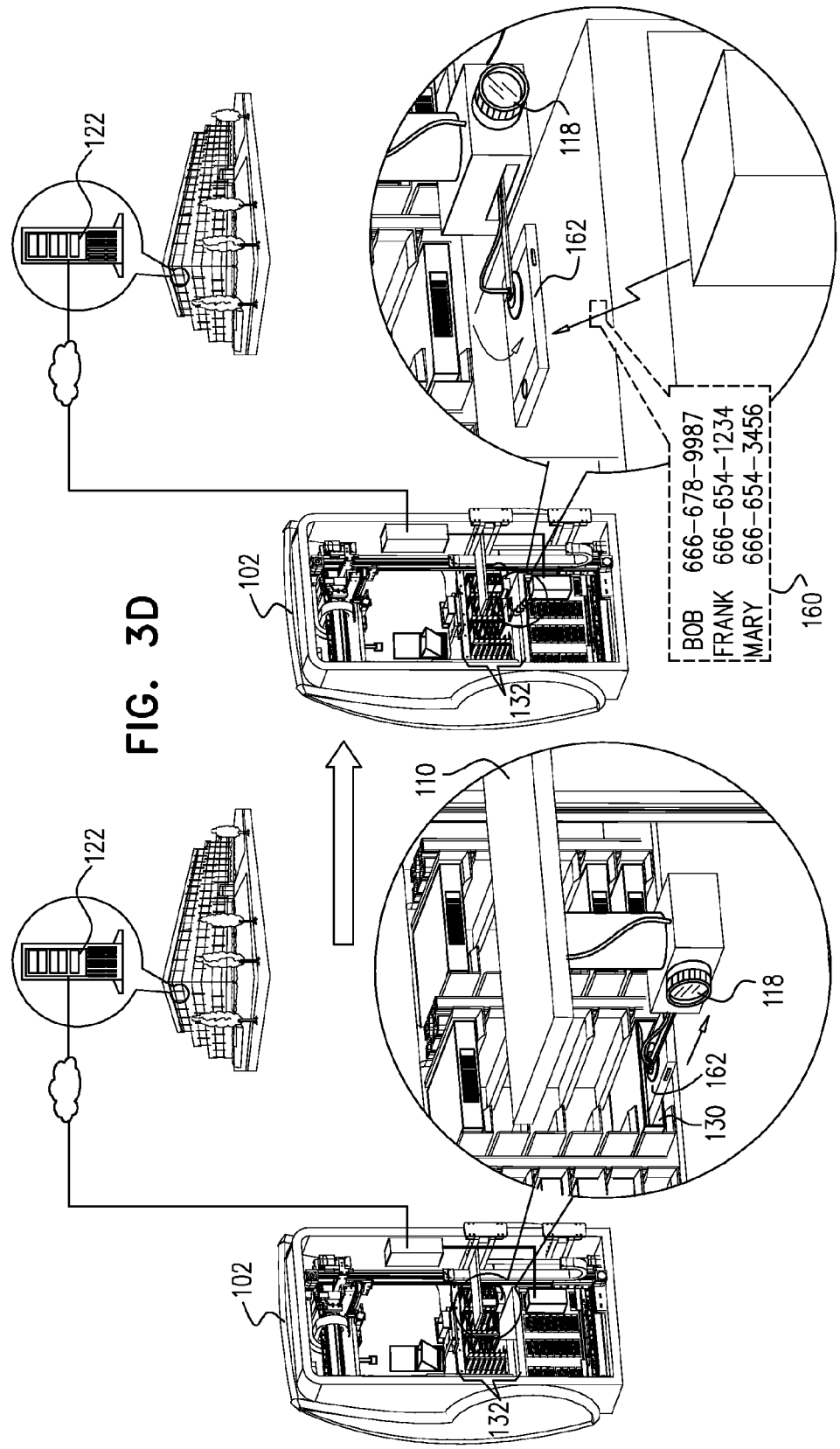

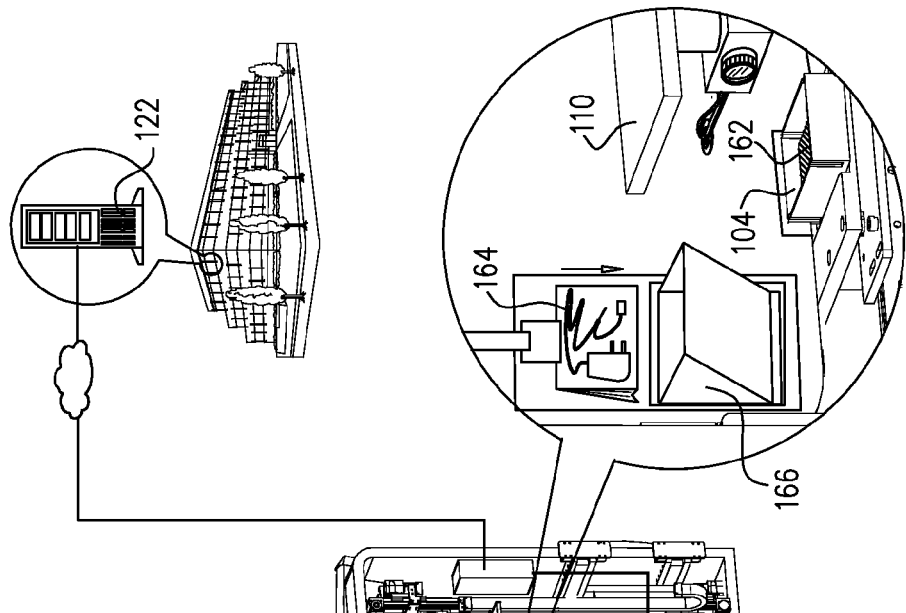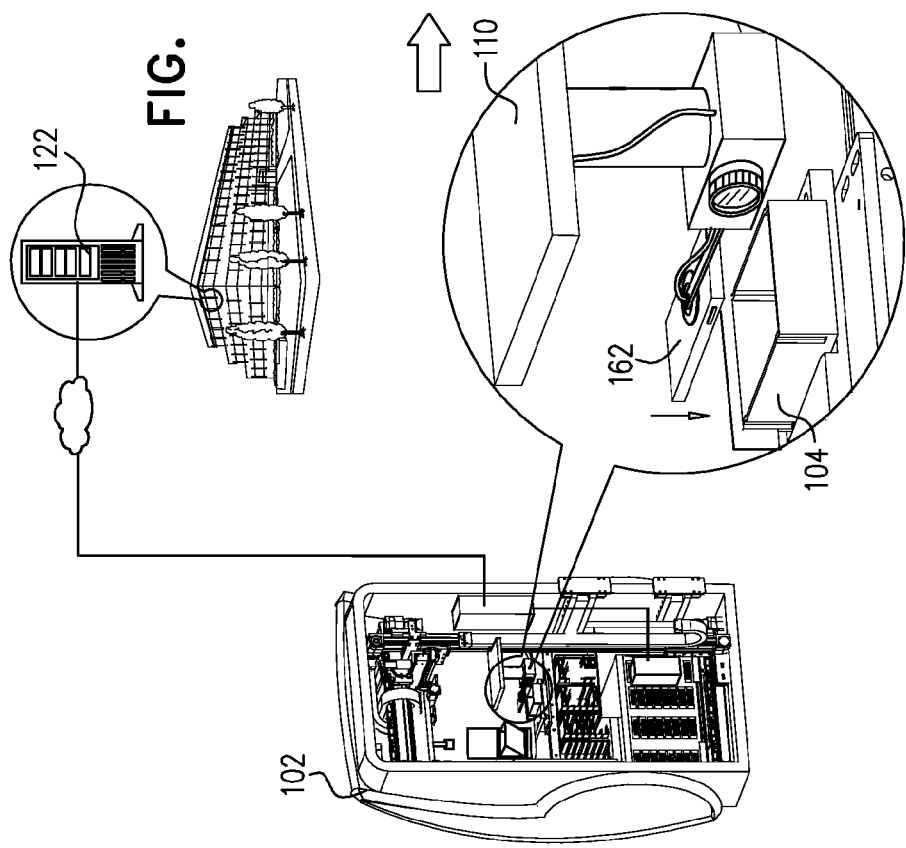
FIG. 3E

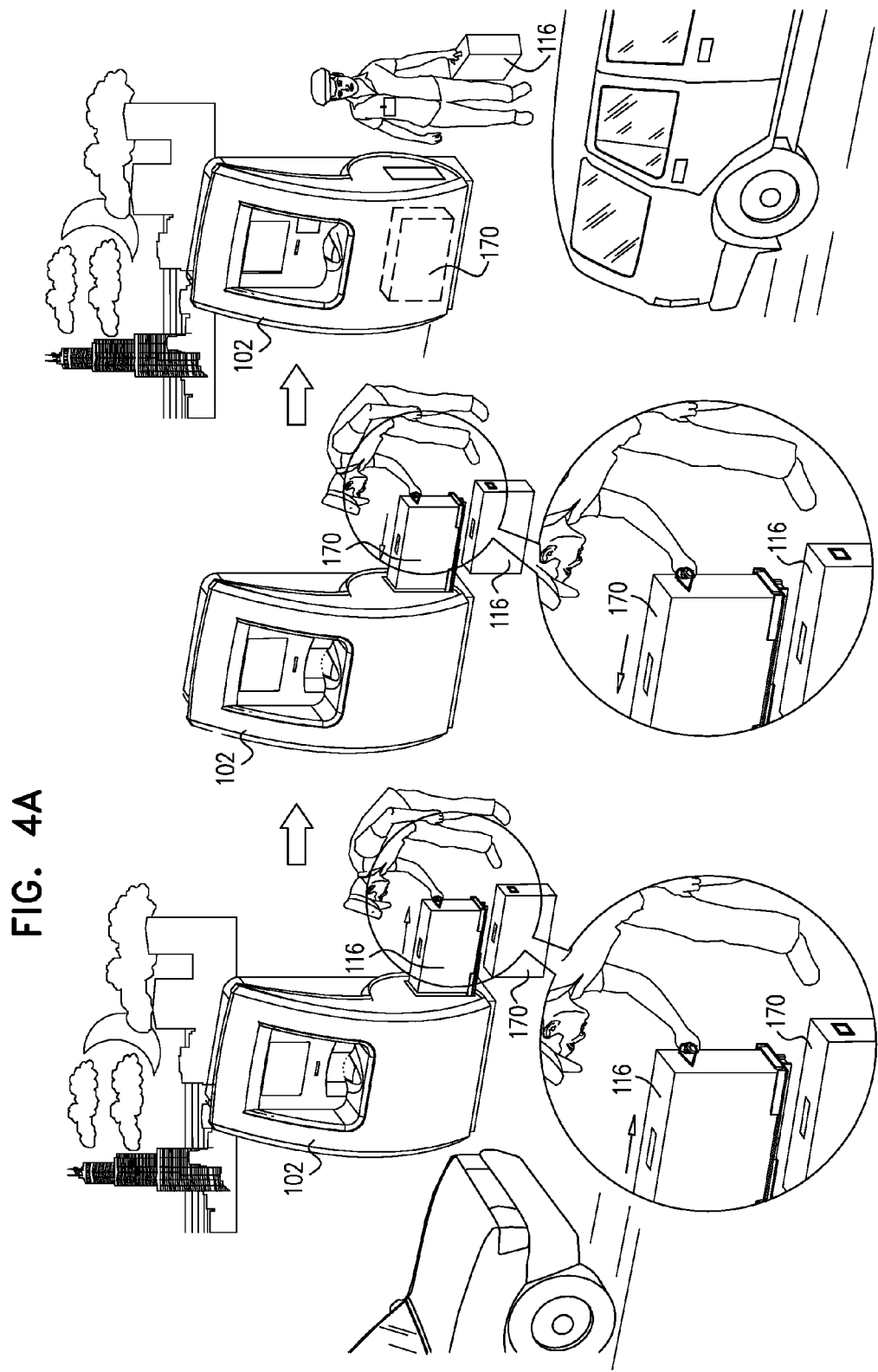

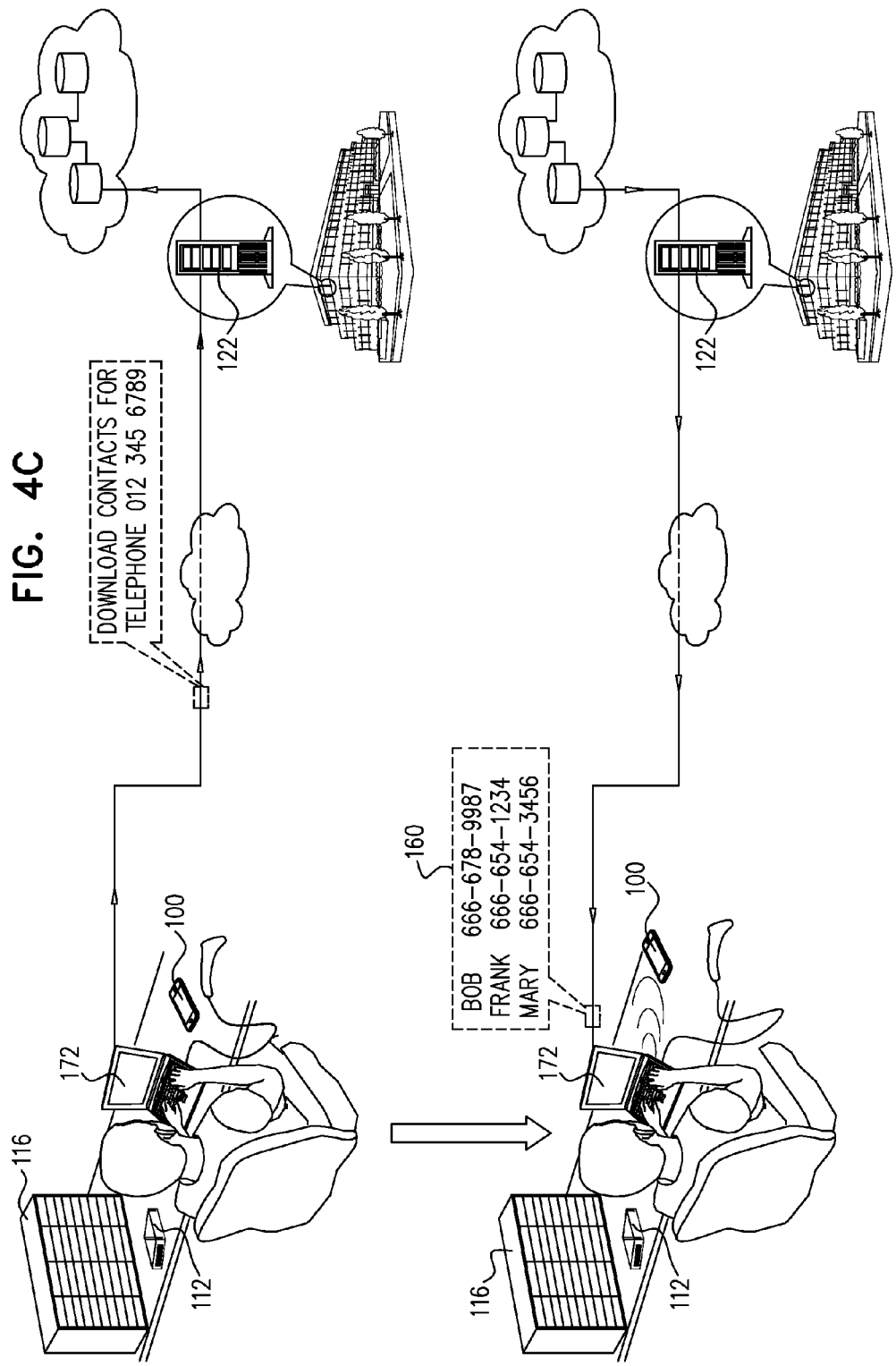

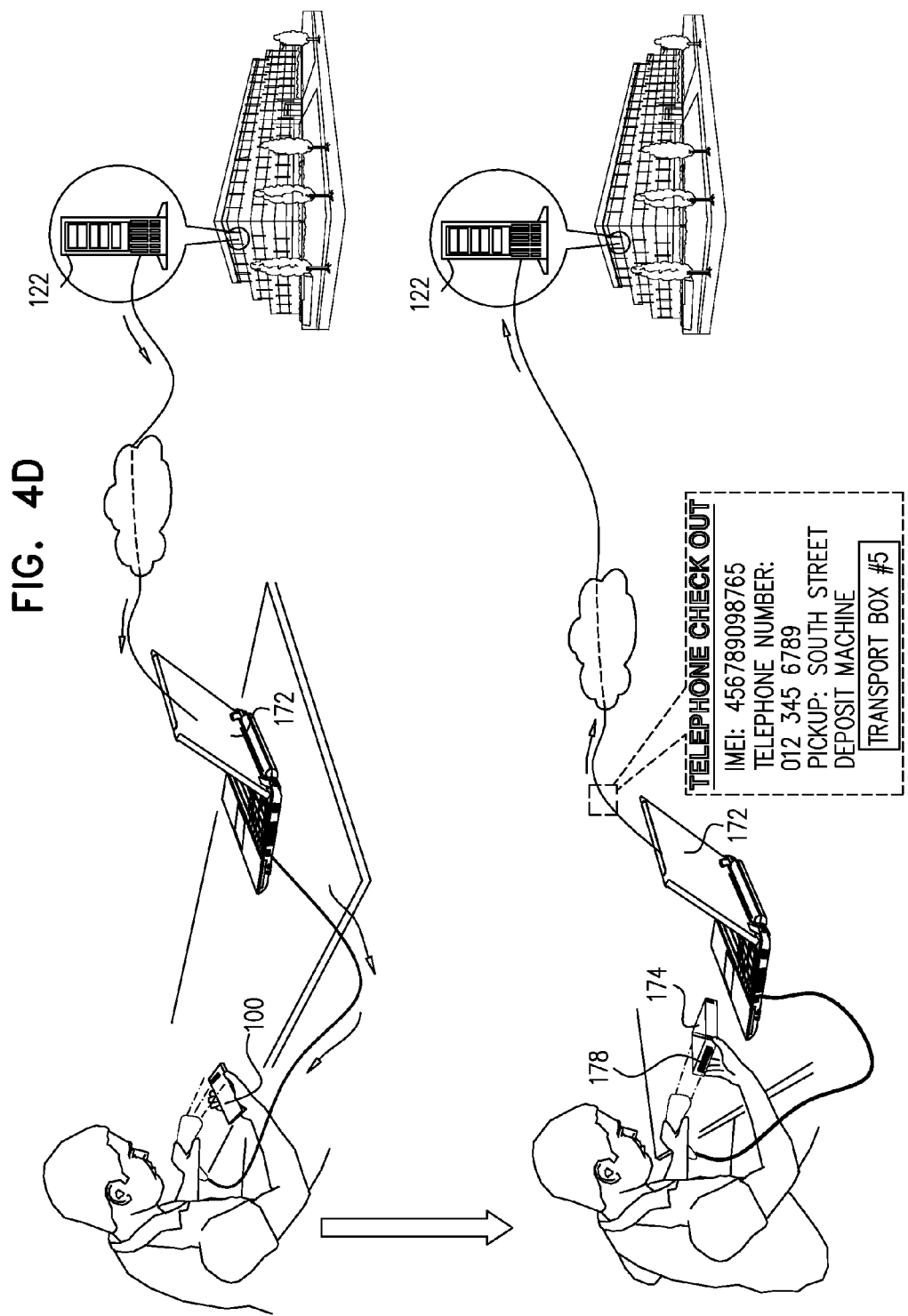

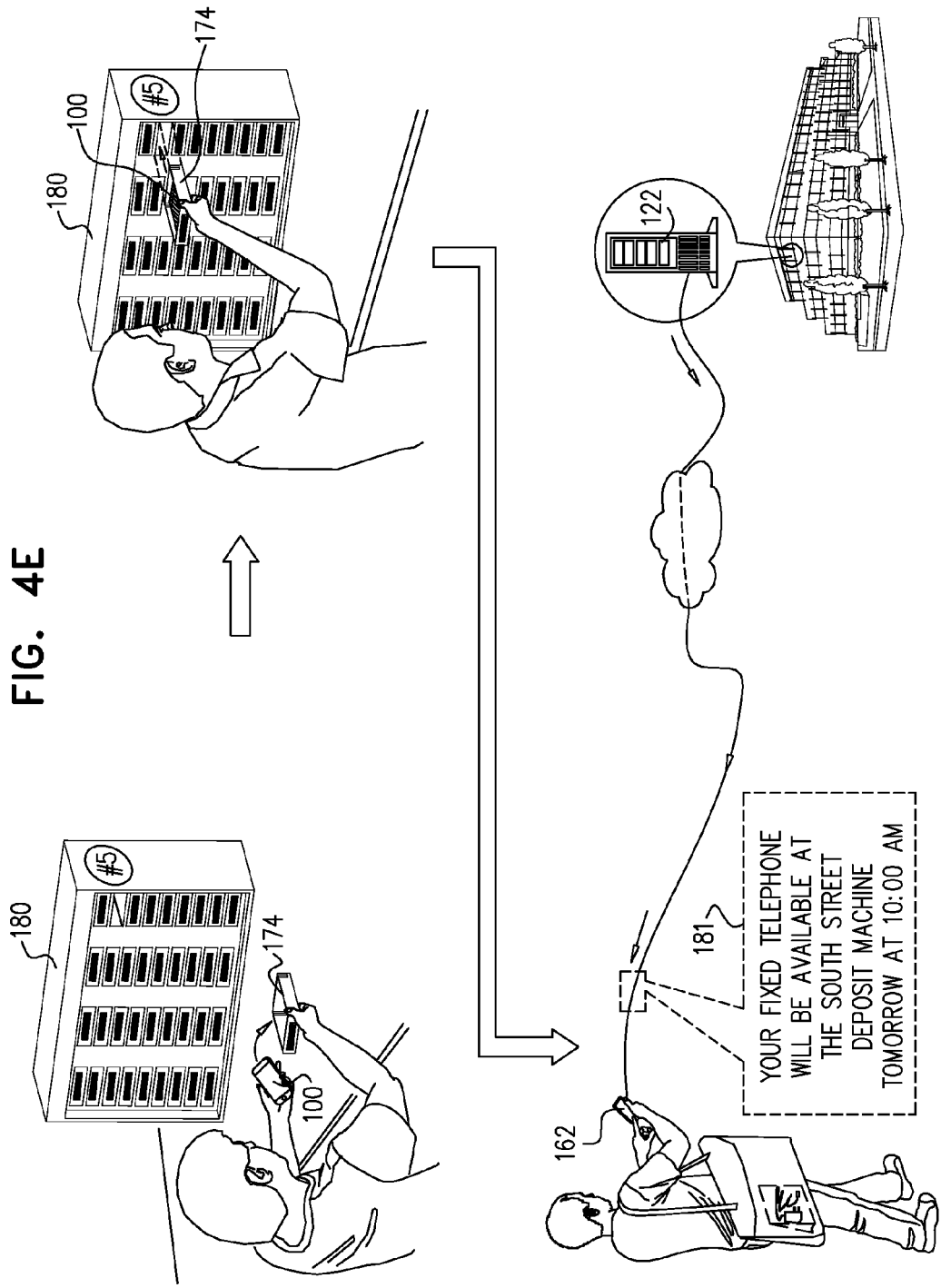

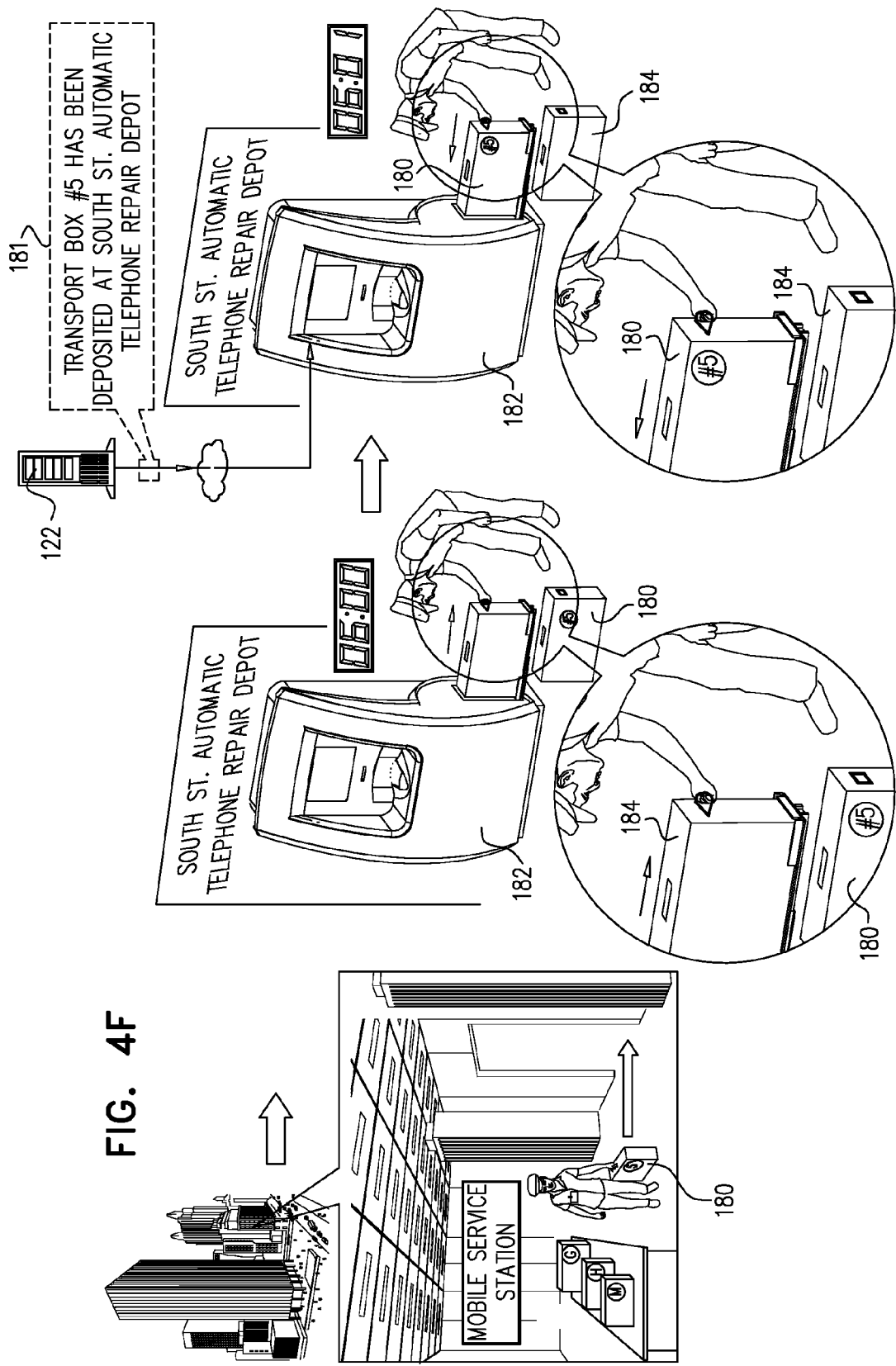

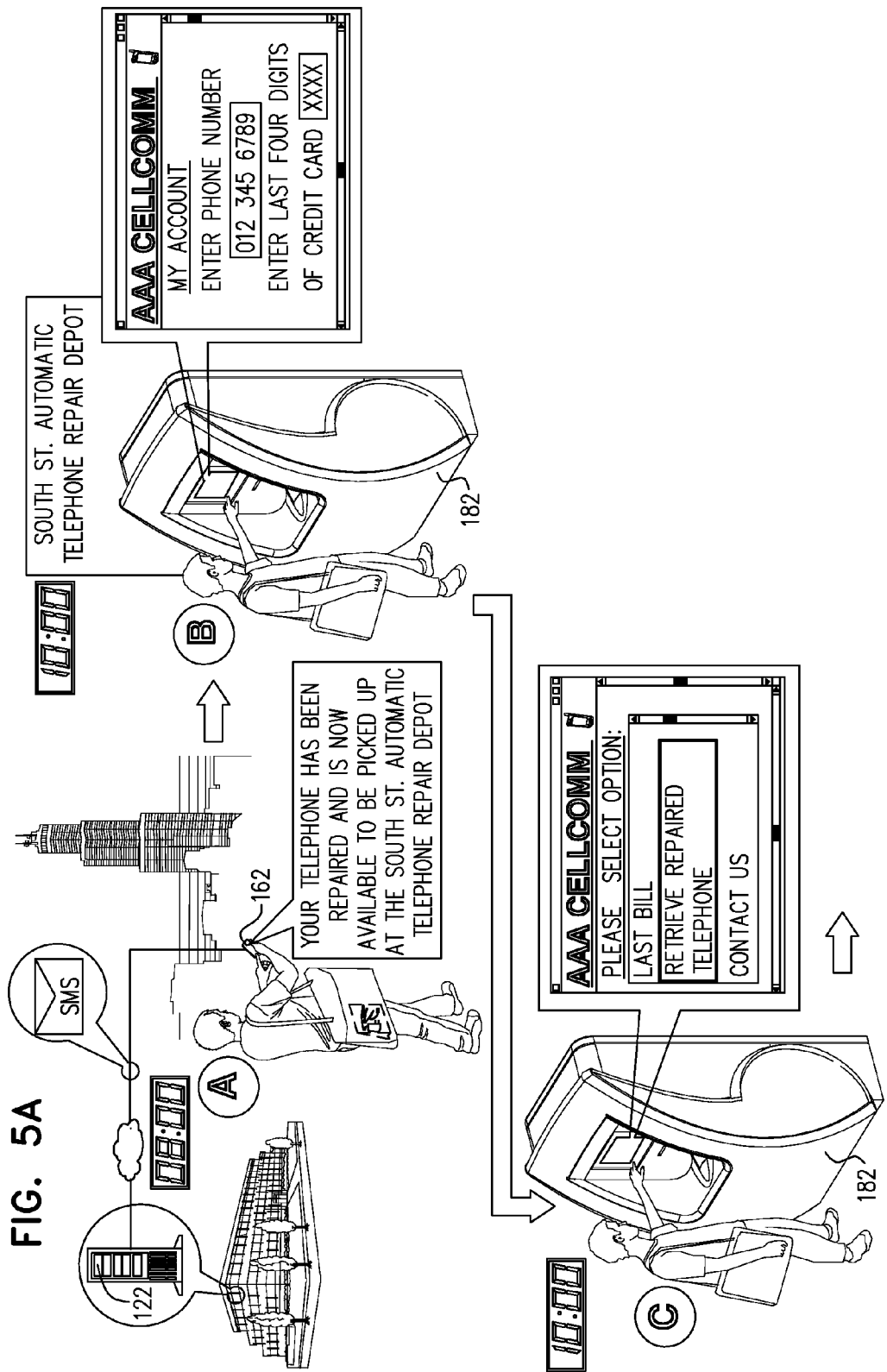

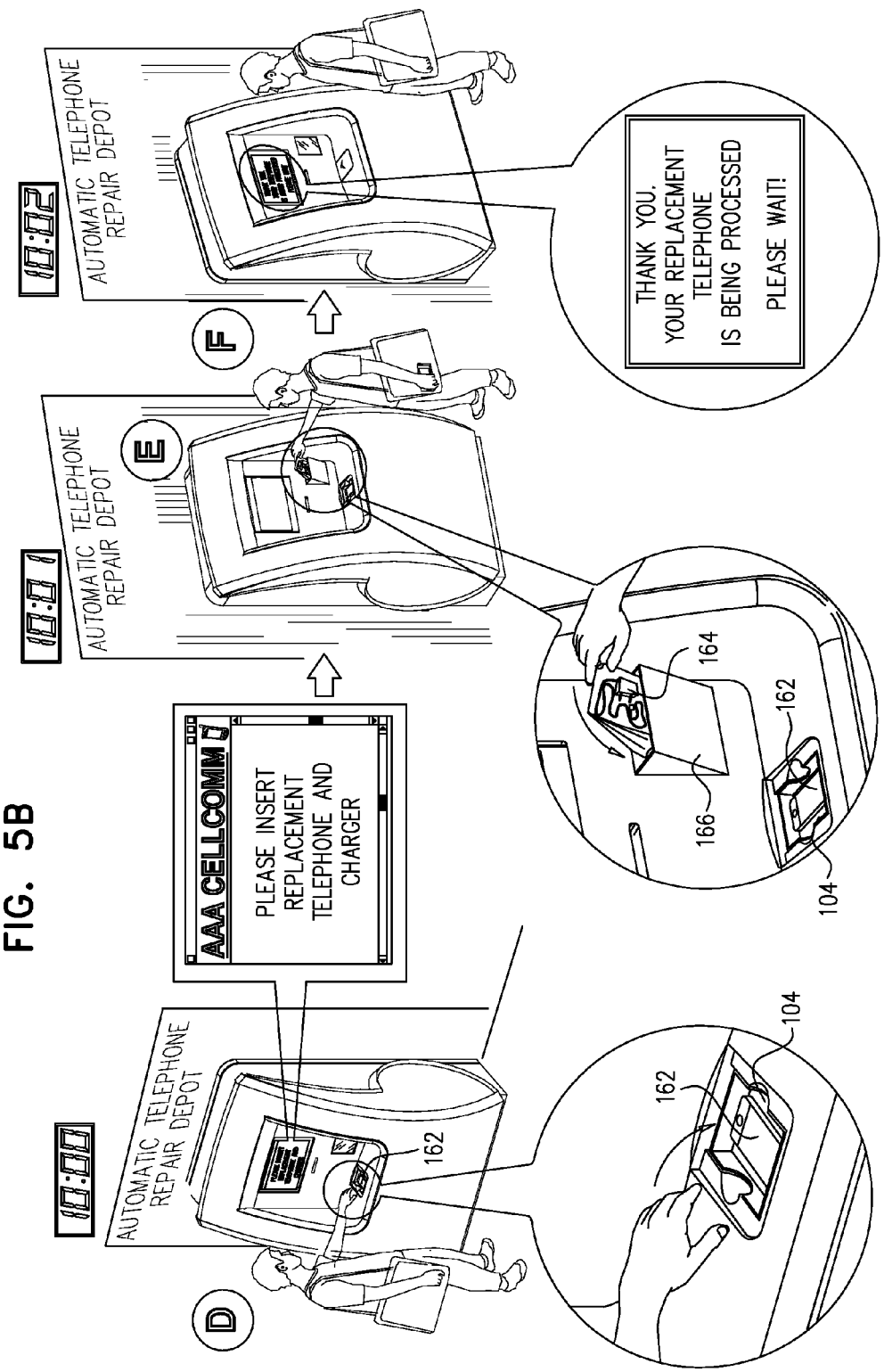

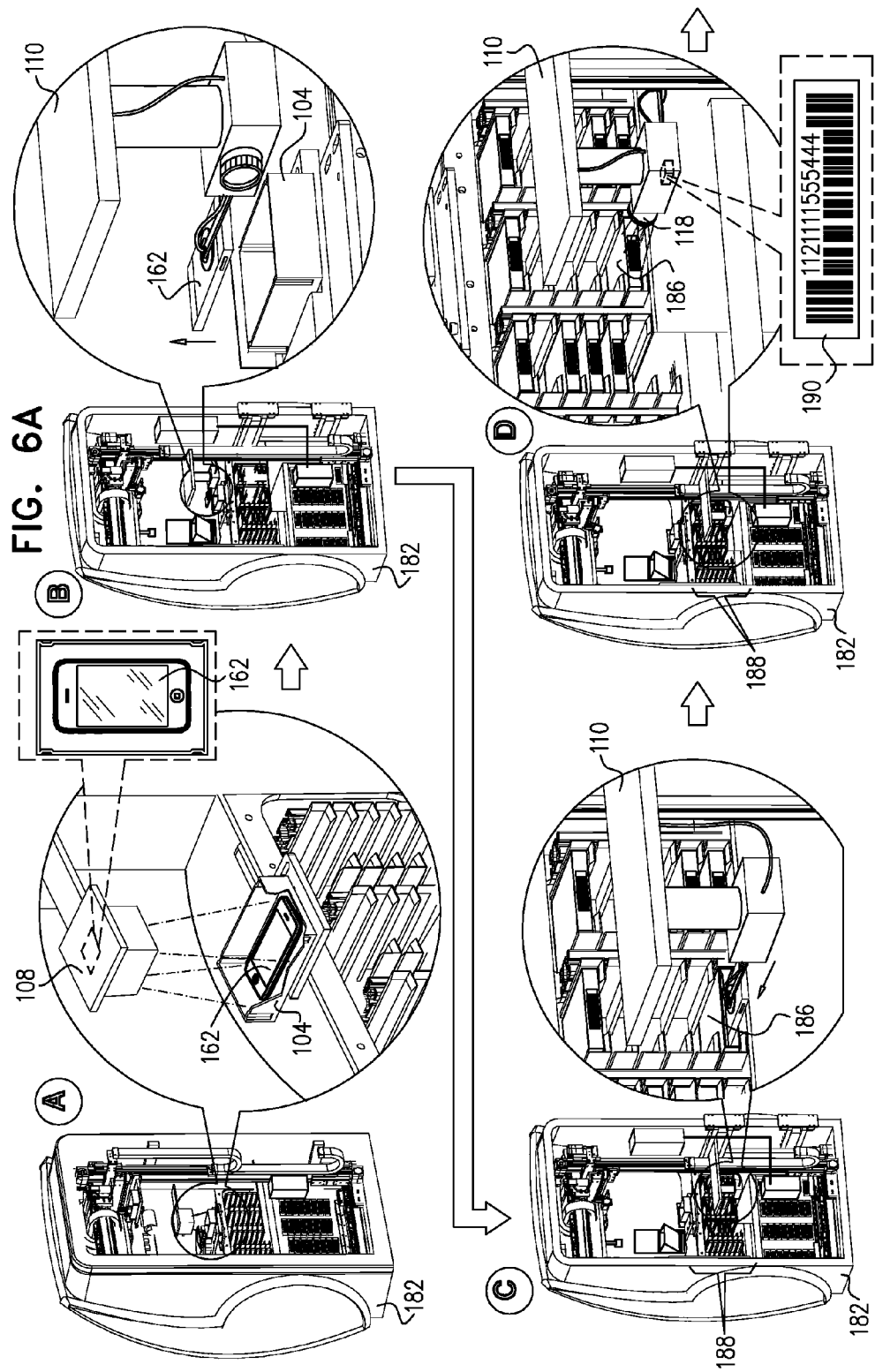

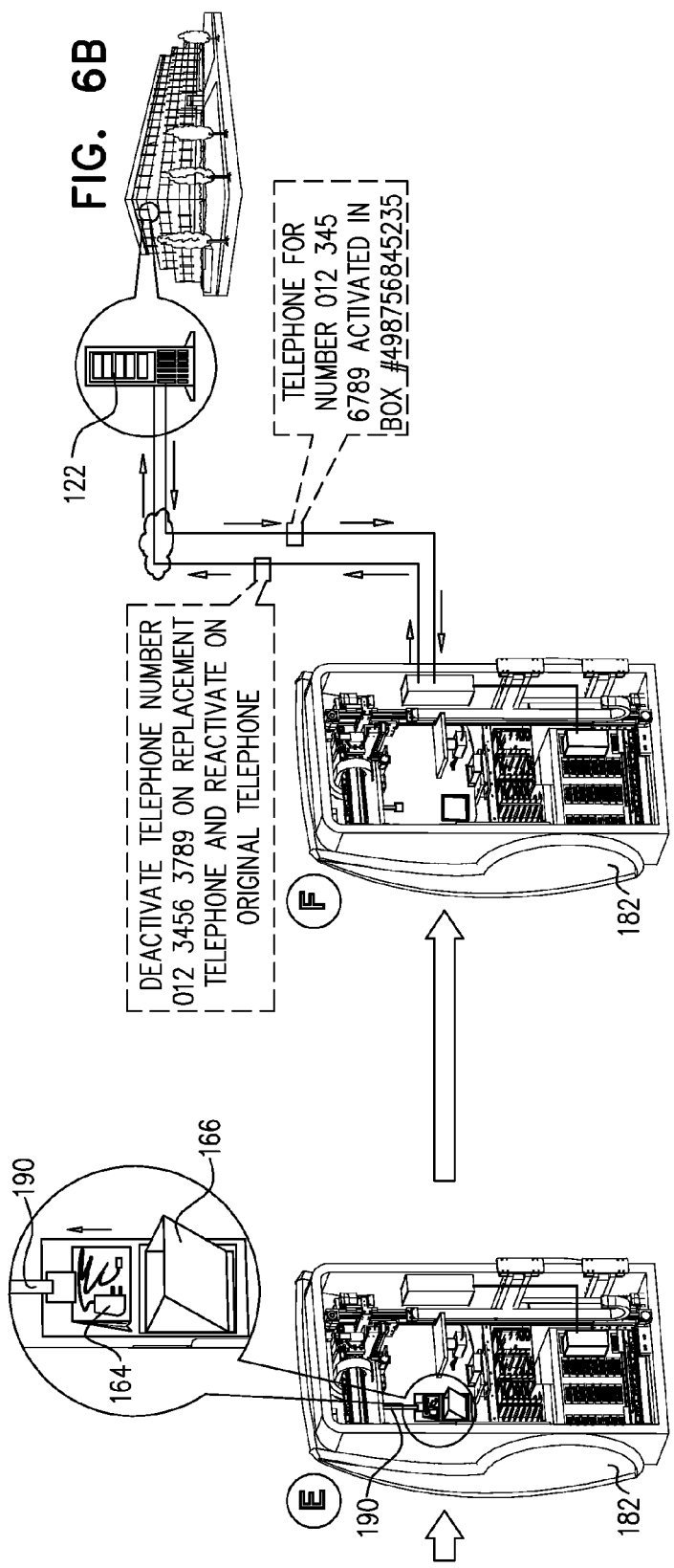

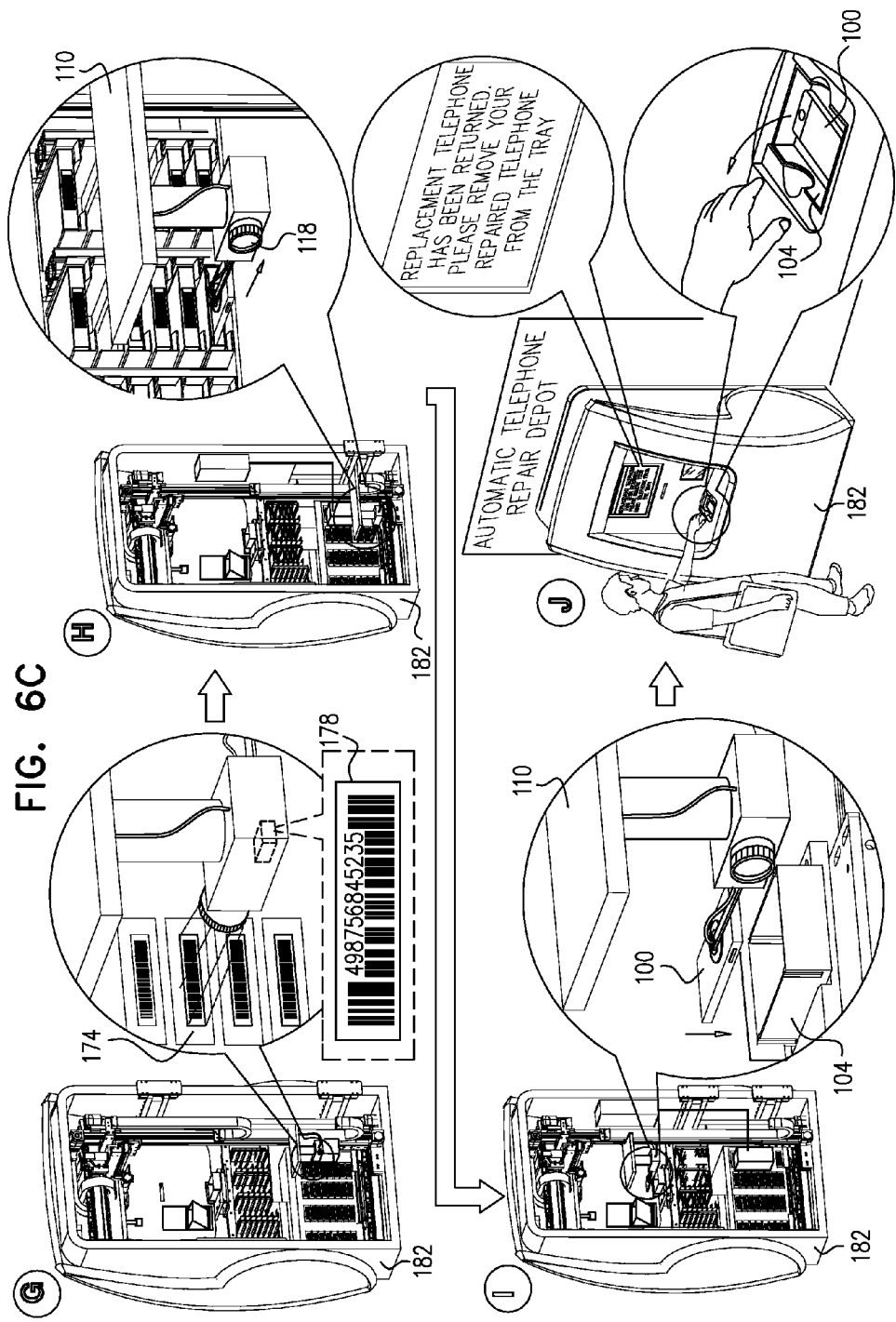

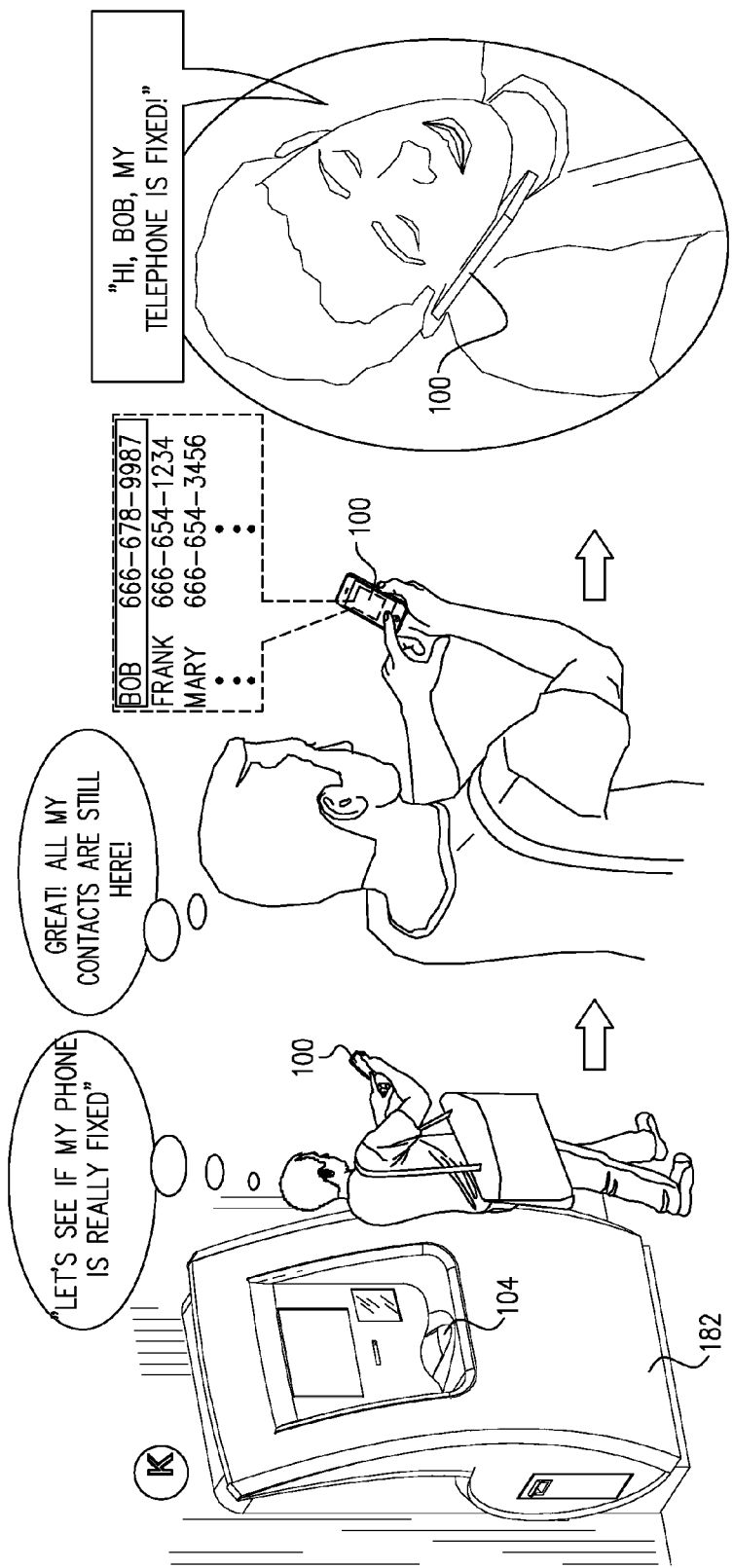

AUTOMATIC MOBILE COMMUNICATOR DEPOT SYSTEM AND METHODOLOGY

REFERENCE TO RELATED APPLICATIONS

This application is a continuation of U.S. patent application Ser. No. 13/629,245, filed Sep. 27, 2012, entitled "AUTOMATIC MOBILE COMMUNICATOR DEPOT SYSTEM AND METHODOLOGY," which claims priority of U.S. Provisional Patent Application Ser. No. 61/577,112, entitled A RECEIVING MALFUNCTIONING MOBILE PHONE AND A DISPENSING FUNCTIONING CELLULAR TELEPHONE CONSOLE, filed Dec. 19, 2011, the disclosures of which are hereby incorporated by reference.

FIELD OF THE INVENTION

The present invention relates to mobile communicator repair and replacement logistics generally.

BACKGROUND OF THE INVENTION

In recent years, the number of mobile communicators in the hands of the public has increased greatly, thus creating a need for efficient logistics for handling repair and replacement thereof.

SUMMARY OF THE INVENTION

The present invention seeks to provide an automatic mobile communicator depot system and methodology. There is thus provided in accordance with a preferred embodiment of the present invention an automatic mobile communicator depot system including a mobile communicator acceptor for accepting mobile communicators and providing mobile communicator acceptance inputs, a mobile communicator dispenser for dispensing substitute mobile communicators in response to substitute mobile communicator dispensing instructions, a customer interface receiving customer inputs identifying a specific mobile communicator with a specific customer, and a depot controller responsive at least to the customer inputs and the acceptance inputs and including dispenser control functionality for providing dispensing instructions to the mobile communicator dispenser to dispense a specific substitute mobile communicator to a specific customer and automatic telephone number transfer functionality for transferring a telephone number from a mobile communicator received by the mobile communicator acceptor from a given customer to the substitute mobile communicator dispensed by the mobile communicator dispenser to the customer.

Preferably, the mobile communicator acceptor is operative to accept from a customer a mobile communicator to be repaired and the mobile communicator dispenser is operative to dispense to the customer a temporary replacement mobile communicator to be used until the customer's mobile communicator is returned in a repaired state to the customer. Additionally or alternatively, the mobile communicator acceptor is operative to accept from a customer a mobile communicator to be replaced and the mobile communicator dispenser is operative to dispense to the customer a permanent replacement mobile communicator.

Preferably, the mobile communicator acceptor is also operative to accept from the customer the temporary replacement mobile communicator and the mobile communicator dispenser is operative to dispense the mobile communicator earlier received by the mobile communicator acceptor from the customer, to the customer in a repaired state. Additionally or alternatively, the mobile communicator acceptor is operative to accept from the customer a temporary replacement mobile communicator dispensed to the customer by a mobile communicator dispenser which is not the a mobile communicator dispenser, and the mobile communicator dispenser is operative to dispense the mobile communicator earlier received from the customer by a mobile communicator acceptor which is not the mobile communicator acceptor, to the customer in a repaired state.

Preferably, the automatic telephone number transfer functionality is operative for transferring the telephone number from the temporary replacement mobile communicator received by the mobile communicator acceptor from the customer to the mobile communicator dispensed to the customer in a repaired state.

Preferably, the depot controller also includes automatic data transfer functionality operable for transferring of data stored in a mobile communicator received by the mobile communicator acceptor from a given customer to the temporary substitute mobile communicator dispensed by the mobile communicator dispenser to the customer. Preferably, the data includes at least part of a contact list. Preferably, the transferring of data is at least partly wireless. Preferably, the automatic data transfer functionality is also operable for transferring of data stored in the temporary substitute mobile communicator earlier received by the mobile communicator acceptor from a given customer to the mobile communicator dispensed to the customer in a repaired state.

Additionally or alternatively, the depot controller also includes automatic data transfer functionality operable for transferring of data of a given customer, the data stored in an internet accessible storage facility, to the temporary substitute mobile communicator dispensed by the mobile communicator dispenser to the customer. Preferably, the data includes at least part of a contact list. Preferably, the transferring of data is at least partly wireless.

Preferably, the depot system also includes a customer internet interface operable for receiving customer inputs identifying a specific mobile communicator with a specific customer via the internet. Preferably, the customer inputs include at least a telephone number of the specific mobile communicator. Preferably, the customer inputs include at least a description of a malfunction of the specific mobile communicator which needs to be repaired and a preferred future pickup location of the specific mobile communicator in a repaired state.

Preferably, the mobile communicator acceptor also includes imaging functionality for capturing an image of at least part of the specific mobile communicator.

Preferably, the mobile communicator acceptor also includes depot-service center communication functionality operative for communicating between the depot and at least one mobile communicator service center. Preferably, the depot-service center communication functionality is operable for communicating at least some of the customer inputs to the at least one mobile communicator service center.

Preferably, the mobile communicator acceptor is also operative to place the specific mobile communicator into a bin located within a mobile communicator storage and transport structure. Preferably, the depot-service center communication functionality is operable for communicating the identities of the bin and of the mobile communicator storage and transport structure to the at least one mobile communicator service center in association with a unique identifier of the specific mobile communicator.

Preferably, at least part of the identities of the bin and of the mobile communicator storage and transport structure are encoded in barcodes imprinted on respective ones of the bin and the mobile communicator storage and transport structure. Preferably, the depot system also includes barcode scanning functionality operable for reading the barcodes.

Preferably, the automatic telephone number transfer functionality is operative to employ the depot-service center communication functionality to employ the at least one mobile communicator service center for the transferring a telephone number.

Preferably, the mobile communicator dispenser is also operable for dispensing, to the customer, mobile communicator accessories suitable for use with the substitute mobile communicators to be used until the customer's mobile communicator is returned in a repaired state to the customer, and the mobile communicator acceptor is also operable for accepting, from the customer, the mobile communicator accessories earlier dispensed to the customer, upon return of the customer's mobile communicator in a repaired state to the customer. Preferably, the accessories include at least one of a mobile communicator charger and a data synchronizing cable.

Preferably, the mobile communicator storage and transport structure is operable for removal thereof from the depot and for transport between the depot and the mobile communicator service center.

Preferably, the depot also includes customer messaging functionality operative to notify the customer that his mobile communicator has been repaired and will be available for pickup at a specific automatic mobile communicator depot at a specific time. Additionally or alternatively, the depot also includes customer messaging functionality operative to notify the customer that his mobile communicator has been repaired and is available for pickup at a specific automatic mobile communicator depot.

There is also provided in accordance with another preferred embodiment of the present invention a method for operating an automatic mobile communicator depot including accepting mobile communicators and providing mobile communicator acceptance inputs, dispensing substitute mobile communicators in response to substitute mobile communicator dispensing instructions, receiving customer inputs identifying a specific mobile communicator with a specific customer, and responsive at least to the customer inputs and the acceptance inputs, providing dispensing instructions to the mobile communicator dispenser to dispense a specific substitute mobile communicator to a specific customer, and automatically transferring a telephone number from a mobile communicator received by the mobile communicator acceptor from a given customer to the substitute mobile communicator dispensed by the mobile communicator dispenser to the customer.

Preferably, accepting mobile communicators includes accepting from a customer a mobile communicator to be repaired, and dispensing substitute mobile communicators includes dispensing to the customer a temporary replacement mobile communicator to be used until the customer's mobile communicator is returned in a repaired state to the customer. Additionally or alternatively, accepting mobile communicators includes accepting from a customer a mobile communicator to be replaced, and dispensing substitute mobile communicators includes dispensing to the customer a permanent replacement mobile communicator.

Preferably, accepting mobile communicators includes accepting from the customer the temporary replacement mobile communicator, and dispensing substitute mobile communicators includes dispensing the mobile communicator earlier received from the customer, to the customer in a repaired state.

Preferably, the transferring includes automatically transferring the telephone number from the temporary replacement mobile communicator received from the customer to the mobile communicator dispensed to the customer in a repaired state.

Preferably, the method also includes automatically transferring data stored in a mobile communicator received from a given customer to the temporary substitute mobile communicator dispensed to the customer. Preferably, the data includes at least part of a contact list. Preferably, the transferring of data is at least partly wireless. Preferably, the method also includes automatically transferring data stored in the temporary substitute mobile communicator earlier received from the given customer to the mobile communicator dispensed to the customer in a repaired state.

Additionally or alternatively, the method also includes automatically transferring data of a given customer, the data stored in an internet accessible storage facility, to the temporary substitute mobile communicator dispensed to the customer. Preferably, the data includes at least part of a contact list. Preferably, the transferring of data is at least partly wireless.

Preferably, the method also includes receiving customer inputs identifying a specific mobile communicator with a specific customer via the internet.

Preferably, the customer inputs include at least a telephone number of the specific mobile communicator. Preferably, the customer inputs include at least a description of a malfunction of the specific mobile communicator which needs to be repaired and a preferred future pickup location of the specific mobile communicator in a repaired state.

Preferably, the method also includes capturing an image of at least part of the specific mobile communicator. Preferably, the method also includes communicating between the depot and at least one mobile communicator service center. Preferably, the communicating includes communicating at least some of the customer inputs to the at least one mobile communicator service center.

Preferably, the method also includes placing the specific mobile communicator into a bin located within a mobile communicator storage and transport structure. Preferably, the communicating includes communicating the identities of the bin and of the mobile communicator storage and transport structure to the at least one mobile communicator service center in association with a unique identifier of the specific mobile communicator.

Preferably, at least part of the identities of the bin and of the mobile communicator storage and transport structure are encoded in barcodes imprinted on respective ones of the bin and the mobile communicator storage and transport structure.

Preferably, the method also includes dispensing, to the customer, mobile communicator accessories suitable for use with the substitute mobile communicators to be used until the customer's mobile communicator is returned in a repaired state to the customer, and accepting, from the customer, the mobile communicator accessories earlier dispensed to the customer, upon return of the customer's mobile communicator in a repaired state to the customer. Preferably, the accessories include at least one of a mobile communicator charger and a data synchronizing cable.

Preferably, the mobile communicator storage and transport structure is operable for removal thereof from the depot and for transport between the depot and the mobile communicator service center.

Preferably, the method also includes notifying the customer that his mobile communicator has been repaired and will be available for pickup at a specific automatic mobile communicator depot at a specific time. Additionally or alternatively, the method also includes notifying the customer that his mobile communicator has been repaired and is available for pickup at a specific automatic mobile communicator depot.

BRIEF DESCRIPTION OF THE DRAWINGS

The present invention will be understood and appreciated more fully from the following detailed description, taken together with the drawings in which:

FIGS. 1A, 1B and 1C are simplified illustrations of three examples of an initial stage of mobile communicator depot methodology in accordance with a preferred embodiment of the present invention;

FIGS. 2A, 2B and 2C together are a simplified illustration of an automatic acceptance processing of a customer's mobile communicator stage of mobile communicator depot methodology in accordance with a preferred embodiment of the present invention;

FIGS. 3A, 3B, 3C, 3D, 3E, 3F and 3G together are a simplified illustration of a replacement mobile communicator personalization and dispensing stage of mobile communicator depot methodology in accordance with a preferred embodiment of the present invention;

FIGS. 4A, 4B, 4C, 4D, 4E and 4F together are a simplified illustration of a back-end processing stage of mobile communicator depot methodology in accordance with a preferred embodiment of the present invention;

FIGS. 5A and 5B together are a simplified illustration of a replacement mobile communicator return stage of mobile communicator depot methodology in accordance with a preferred embodiment of the present invention; and FIGS. 6A, 6B, 6C and 6D together are a simplified illustration of replacement mobile communicator acceptance, validation and depersonalization functionality and customer's mobile communicator repersonalization and dispensing functionality in accordance with a preferred embodiment of the present invention.

DETAILED DESCRIPTION OF PREFERRED EMBODIMENTS

Figure 3F:
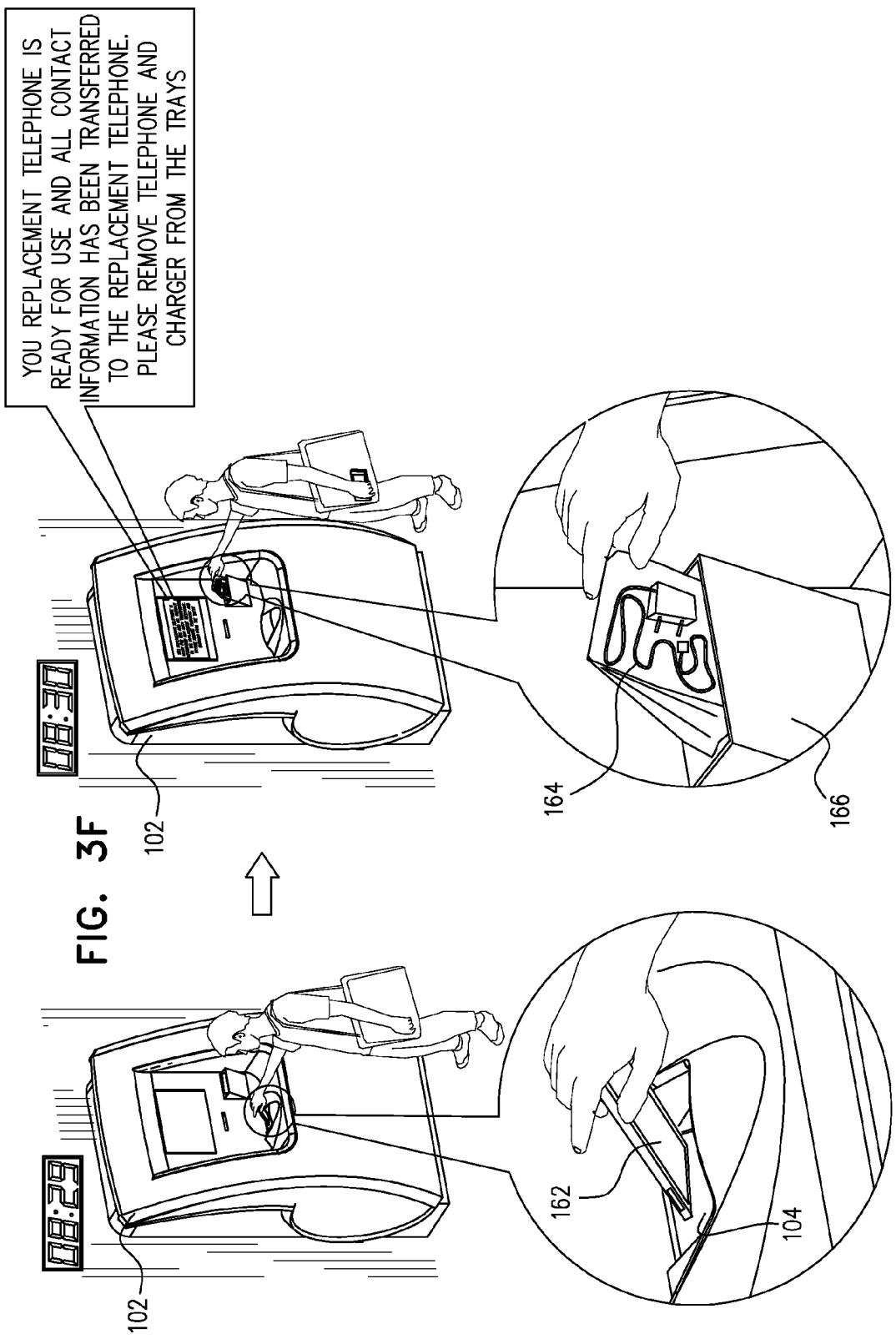
Figure 3G:
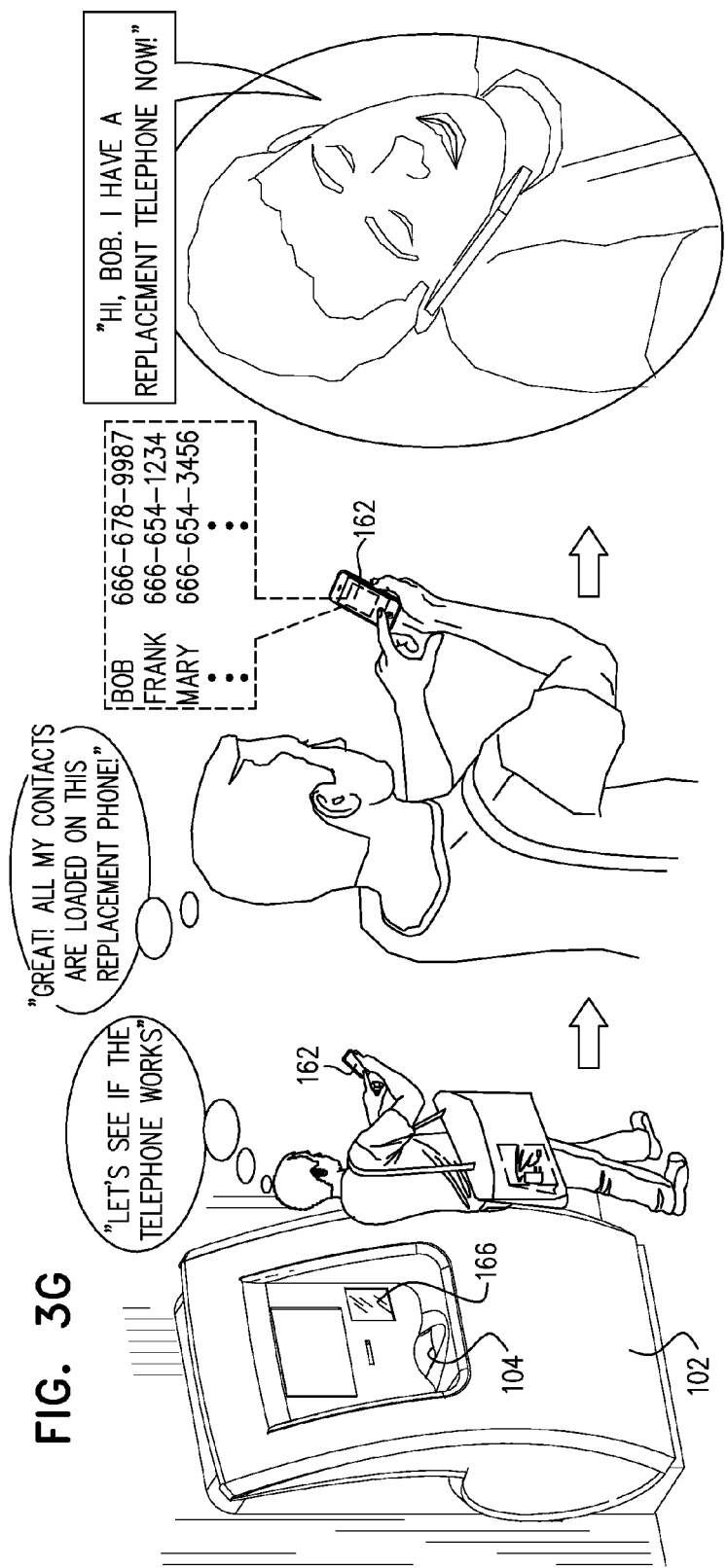

Reference is now made to FIGS. 1A, 1B and 1C, which are simplified illustrations of three examples of an initial stage of mobile communicator depot methodology in accordance with a preferred embodiment of the present invention. Turning to FIG. 1A, there is shown a scenario wherein a customer, whose mobile communicator 100, here a smartphone, is broken, initiates a repair over the internet such as by using his home computer to access the customer service website of cellular telephone service provider.

Typically the customer identifies himself to the customer service website by entering his mobile communicator telephone number and a unique identifier, such as the last four digits of his credit card. The customer may then select the Automated Telephone Repair Service and is then prompted to describe the problem with his mobile communicator 100, such as a broken screen. It is appreciated that once the customer enters the telephone number of mobile communicator 100, the system already has information regarding the identity, type and functionality of mobile communicator 100.

The customer is preferably directed to the nearest repair depot 102 and may be shown its location on a map.

Upon arrival at the repair depot 102, the customer is prompted to identify himself and his mobile communicator 100 by entering his mobile communicator telephone number and a unique identifier, such as the last four digits of his credit card.

Turning to FIG. 1B, there is shown an alternative scenario wherein a customer, whose mobile communicator 100, here a smartphone, is broken, initiates a repair over the internet such as by using another mobile communicator 103, such as an iPAD to access the customer service website of cellular telephone service provider.

Typically the customer identifies himself by entering his mobile communicator telephone number and a unique identifier, such as the last four digits of his credit card. The customer may then select the Automated Telephone Repair Service and is then prompted to describe the problem with his mobile communicator 100, such as a broken screen. It is appreciated that once the customer enters the telephone number of mobile communicator 100, the system already has information regarding the identity, type and functionality of mobile communicator 100.

The customer is preferably directed to the nearest repair depot 102 and may be shown its location on a map.

Upon arrival at the repair depot 102, the customer is prompted to identify himself and his mobile communicator by entering his mobile communicator telephone number and a unique identifier, such as the last four digits of his credit card.

Turning to FIG. 1C, there is shown a scenario wherein a customer, whose mobile communicator 100, here a smartphone, is broken, is unable to initiate a repair over the internet, since he does not have access to the internet. In such a case, the customer may go directly to a repair depot 102.

Typically the repair depot 102 interacts directly with the customer and prompts the customer to identify himself by entering his mobile communicator telephone number and a unique identifier, such as the last four digits of his credit card. The customer is then prompted to describe the problem with his mobile communicator, such as a broken screen. It is appreciated that once the customer enters the telephone number of mobile communicator 100, the system already has information regarding the identity, type and functionality of mobile communicator 100.

Reference is now made to FIGS. 2A, 2B and 2C, which together are a simplified illustration of an automatic acceptance processing of a customer's mobile communicator stage of mobile communicator depot methodology in accordance with a preferred embodiment of the present invention. As seen in FIG. 2A, upon arrival at depot 102, a customer is prompted to place his mobile communicator 100 in a receiving receptacle 104.

As shown in FIG. 2B, depot 102 preferably includes functionality for confirming that mobile communicator 100 is placed in the receptacle 104 with its screen 106 facing upwards and also includes a camera 108 for photographing the top surface of mobile communicator 100, the top surface including screen 106.

A robotic mechanism 110 is preferably employed for initially repositioning the receptacle 104 containing mobile communicator 100 from its initial position, shown in FIG. 2A, at which the customer placed mobile communicator 100 therein, to a second position, shown in FIG. 2B at which the top surface of mobile communicator 100 is photographed by camera 108, to a third position in which mobile communicator is disposed within one of a multiplicity of bins 112, each of which is preferably identified by a barcode 114 and which are located in a storage and transport structure 116.

A barcode scanner 118 is preferably mounted on robotic mechanism 110 for reading barcode 114 of bin 112 in which the customer's mobile communicator 100 is placed, for recording the identity of bin 112 and for associating it with the identity of customer's mobile communicator 100 in a computerized database.

As shown in FIG. 2C, a virtual repair ticket 120 is preferably generated. Virtual repair ticket 120 preferably includes the customer's mobile communicator telephone number, the bin number of the bin in which mobile communicator 100 is disposed, and a description of the required repair as provided by the customer. The virtual repair ticket 120 is preferably transmitted via the internet to a central server 122, typically located at a site remote from depot 102, which site may house a repair center.

The customer receives an acknowledgement of receipt of the deposited mobile communicator 102, preferably in the form of an audio-visual message which is backed up by a virtual email message and preferably is prompted to select a preferred pick up location, which need not be the same depot 102. Upon receipt of a user pick up location selection input, the depot 102 preferably provides an acknowledgement, preferably in the form of an audio-visual message which is backed up by a virtual email message.

Reference is now made to FIGS. 3A, 3B, 3C, 3D, 3E, 3F and 3G, which together are a simplified illustration of a replacement mobile communicator personalization and dispensing stage of mobile communicator depot methodology in accordance with a preferred embodiment of the present invention. As shown in FIGS. 3A-3G, it is a particular feature of the present invention that, upon request by the customer, a replacement mobile communicator is automatically provided to the customer by the depot.

As shown in particular in FIG. 3A, depot 102 offers the customer a replacement mobile communicator to be used while his broken mobile communicator is being repaired. As further shown in FIG. 3B, upon accepting the offer, the customer is then asked by depot 102 whether he would prefer that his contact list be transferred to the replacement mobile communicator.

Thereafter, as shown in FIG. 3C, depot 102 selects a replacement communicator bin 130 which is located in a replacement communicator storage and transport structure 132 and which contains a replacement mobile communicator, and preferably employs barcode scanner 118 which is preferably mounted on robotic mechanism 110 to read the barcode 136 of bin 130.

As further shown in FIG. 3C, a virtual mobile communicator activation instruction 140 is preferably generated by depot 102, which instruction 140 preferably includes the customer's mobile communicator telephone number and the bin number of bin 130 retrieved from barcode 136. Instruction 140 is preferably transmitted via the internet to a central server 122, typically located at a site remote from depot 102, which site may house a service center. It is appreciated that server 122 stores information for associating bin numbers of bins in replacement communicator storage and transport structure 132 with identifiers of mobile communicators stored therewithin. Therefore, server 122 may utilize the information in instruction 140 to associate the customer's mobile communicator telephone number with the identifier of the replacement mobile communicator located in bin 130, and to store this information for ascertaining, upon return of repaired mobile communicator 100 to the customer, that the replacement mobile communicator dispensed to the customer is indeed returned.

Responsive to instruction 140, server 122 preferably activates the replacement mobile communicator located in bin 130 in association with the customer's mobile communicator telephone number.

As yet further shown in FIG. 3C, depot 102 then generates a virtual contact list synchronization instruction 150, which instruction 150 preferably includes the customer's/mobile communicator's identifier and the bin number of bin 130 retrieved from barcode 136. Instruction 150 is preferably transmitted via the internet to central server 122 and instructs server 122 to download the customer's contact list to depot 102. It is appreciated that contact lists stored on mobile communicators are typically also stored on the internet on various backup facilities, such as, for example, on a central backup server of the cellular telephone service provider, and therefore may be accessible to server 122.

As yet further shown in FIG. 3C, upon receiving virtual contact list synchronization instruction 150, server 122 preferably transmits the customer's contact list 160 to depot 102 where it is temporarily stored.

Turning now to FIG. 3D, it is shown that robotic mechanism 110 is preferably employed for retrieving replacement mobile communicator 162 from bin 130. Preferably, after replacement mobile communicator 162 is retrieved, depot 102 loads contact list 160 onto mobile communicator 162 preferably by wirelessly communicating therewith. It is appreciated that communication between depot 102 and replacement mobile communicator 162 may alternatively be wired.

Thereafter, as shown in FIG. 3E, robotic mechanism 110 preferably places replacement mobile communicator 162 into receptacle 104, and also preferably places a compatible mobile communicator accessory kit 164 into a dispenser bin 166. It is appreciated that mobile communicator accessory kit 164 may include, for example, a mobile communicator charger and data synchronizing cables.

Turning now to FIG. 3F, is shown that depot 102 thereafter notifies the customer that a replacement mobile communicator having his contact list loaded thereupon has been prepared for him, and prompts the customer to remove replacement mobile communicator 162 and mobile communicator accessory kit 164 from receptacle 104 and bin 166, respectively. As further shown in FIG. 3G, after retrieving replacement mobile communicator 162 and mobile communicator accessory kit 164, the customer ascertains that replacement mobile communicator 162 is loaded with his contact list, and that replacement mobile communicator 162 is fully functional.

Figure 4B:
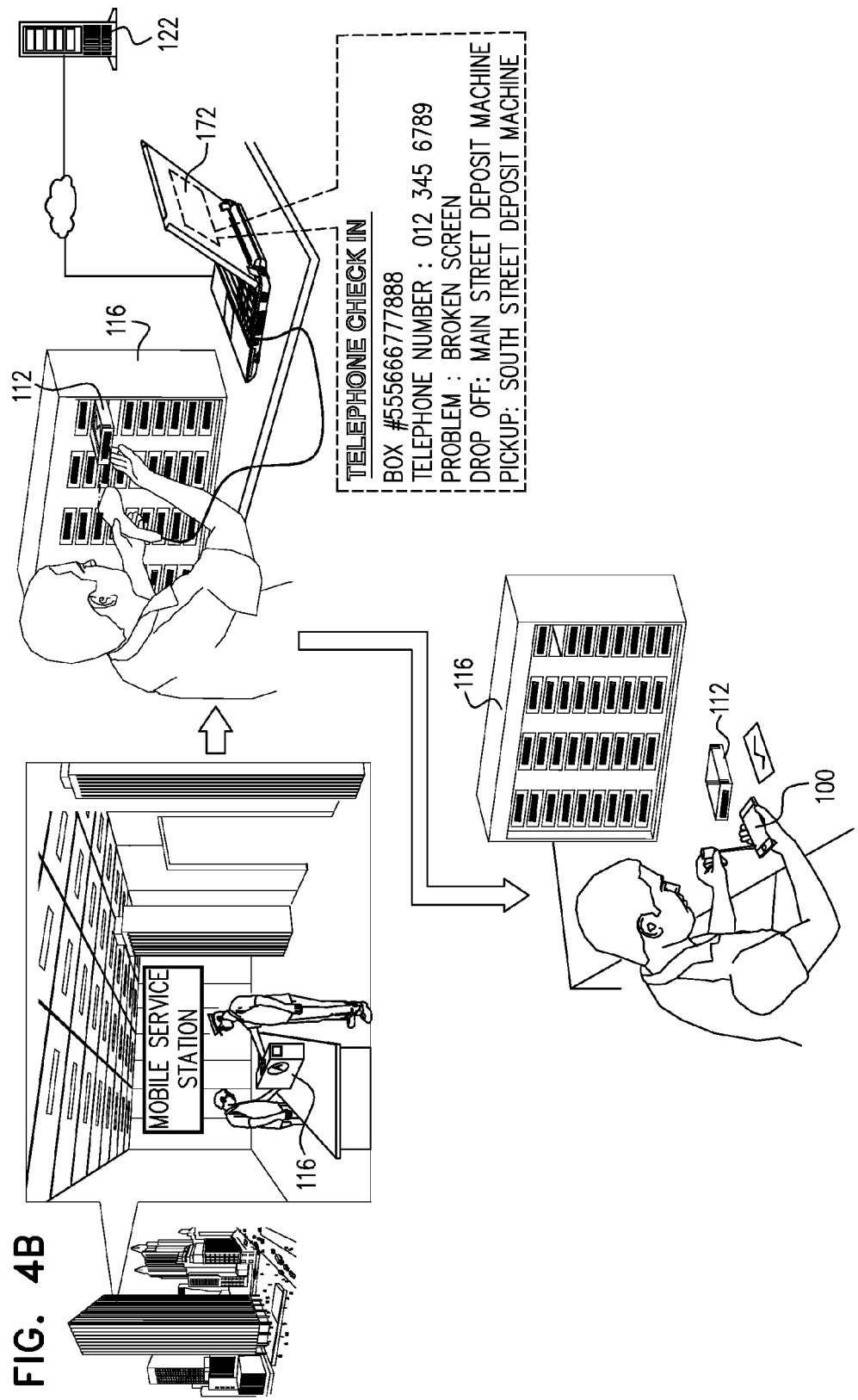

Reference is now made to FIGS. 4A, 4B, 4C, 4D, 4E and 4F, which together are a simplified illustration of a back-end processing stage of mobile communicator depot methodology in accordance with a preferred embodiment of the present invention. As shown in FIG. 4A, a mobile communicator depot service employee arrives at depot 102 and removes storage and transport structure 116 from depot 102. As described hereinabove with regard to FIG. 2A, storage and transport structure 116 preferably comprises bins 112, each of bins 112 preferably containing a mobile communicator destined for repair.

As further shown in FIG. 4A, after removing storage and transport structure 116 from depot 102, the depot service employee inserts an alternative storage and transport structure 170 into depot 102, transport structure 170 preferably having repaired mobile communicators disposed in bins therewithin. The method by which mobile communicators are repaired and disposed within transport structure 170 will be described in greater detail hereinbelow with regard to FIGS. 4B-4E.

As yet further shown in FIG. 4A, after inserting alternative storage and transport structure 170 into depot 102, the depot service employee removes storage and transport structure 116 from the premises and, as shown in FIG. 4B, delivers storage and transport structure 116 to a mobile communicator service center.

Turning now to FIG. 4B, it is shown that a mobile communicator service center employee receives storage and transport structure 116 from the depot service employee and preferably scans the barcode of each of bins 112 which contains a broken mobile communicator into a computer 172. It is appreciated that computer 172 preferably communicates with server 122 and is operative to retrieve information associated with broken mobile communicator 100 which was submitted to server 122 via a virtual repair ticket, such as virtual repair ticket 120 of FIG. 2C. As described hereinabove with regard to FIG. 2C, this information may include, for example, a bin identification number of the bin 112 containing broken mobile communicator 100, a mobile communicator customer identifier such as a telephone number, and a description of the required repair. The information also preferably includes an identifier of the particular depot at which mobile communicator was deposited and an identifier of the preferred pickup location of the repaired mobile communicator as, for example, specified by the customer in the illustration of FIG. 2C.

As yet further shown in FIG. 4B, after retrieving the information of virtual repair ticket 120 from computer 172, the service center employee retrieves mobile communicator 100 from its bin 112 and repairs mobile communicator 100.

It is appreciated that while being repaired, the contact list stored in mobile communicator 100 may be partially or completely deleted. The contact list may have also been partially or completely deleted upon breakage of mobile communicator 100. Therefore, as shown in FIG. 4C, the service center employee preferably utilizes computer 172 to access server 122 to download the customer's contact list 160 to computer 172 in preparation for reactivation of mobile communicator 100. As described hereinabove with regard to the illustration of FIG. 3C, it is appreciated that mobile communicator contact lists are typically also stored on the internet on various backup facilities, such as, for example, on a central backup server of the cellular telephone service provider, and therefore may be accessible to server 122.

As further shown in FIG. 4C, the service center employee preferably loads contact list 160 onto mobile communicator 100 by wirelessly transmitting contact list 160 from computer 172 to mobile communicator 100. Alternatively, transmission of the contact list from computer 172 to mobile communicator 100 may be wired.

Turning now to FIG. 4D, it is shown that after completing the repair of mobile communicator 100 and loading contact list 160 onto repaired mobile communicator 100, the service center employee then preferably utilizes computer 172 to generate a virtual delivery ticket 176 for repaired mobile communicator 100, which ticket 176 preferably includes a physical identifier of communicator 100, such as an IMEI identifier. It is appreciated that the physical identifier may be retrieved from communicator 100, for example, by scanning a barcode embedded in communicator 100 or by manually querying communicator 100 via its user interface.

Preferably, the service center employee also scans a barcode identifier 178 of bin 174 into computer 172 and adds identifier 178 to ticket 176. The service center employee then preferably utilizes computer 172 to communicate with server 122, where the identifier of communicator 100 as provided in ticket 176 is used to identify communicator 100 as that of the customer of FIGS. 1A-3G. Server 122 is also preferably operative to associate the customer's identifier, such as his telephone number, and the preferred pickup location as originally specified by the customer, with ticket 176.

It is appreciated that server 122 is also preferably operative to provide the service center employee with an identifier of a storage and transport structure 180 which is destined for delivery to the customer's preferred pickup location. Upon verifying that the details of ticket 176 are correct, the service center employee preferably submits the completed ticket 176 to server 122. As shown in FIG. 4E, the service center employee then places repaired mobile communicator into bin 174 and inserts bin 174 into storage and transport structure 180 which is destined for delivery to the customer's preferred pickup location.

As further shown in FIG. 4E, server 122 then preferably sends a message 181 to the customer, notifying the customer that his mobile communicator has been repaired and will be available at the pickup location he originally specified on the following day at or after a particular time, such as 10:00 AM. It is appreciated that message 181 may be, for example, an email message or an SMS message sent to the customer's replacement mobile communicator 162.

Turning now to FIG. 4F, it is shown that a communicator depot service employee arrives at the mobile communicator service center on the following day at 6:00 AM, and retrieves storage and transport structure 180 for transport to a mobile communicator depot 182 located at the customer's preferred pickup location.

As further shown in FIG. 4F, upon arriving at depot 182, the communicator depot service employee preferably removes a storage and transport structure 184 from within depot 182 for transport to mobile communicator service center. Thereafter, the communicator depot service employee inserts storage and transport structure 180 into depot 182, storage and transport structure 180 having repaired mobile communicators disposed therewithin. As yet further shown in FIG. 4F, upon insertion of storage and transport structure 180 into depot 182, depot 182 preferably sends a message to server 122, notifying server 122 that storage and transport structure 180 having repaired mobile communicators disposed therewithin has been inserted into depot 182.

Reference is now made to FIGS. 5A and 5B, which together are a simplified illustration of a replacement mobile communicator return stage of mobile communicator depot methodology in accordance with a preferred embodiment of the present invention. As shown in FIG. 5A, after storage and transport structure 180 containing repaired mobile communicator 100 has been deposited in depot 182, such as at 8:00 AM, the customer preferably receives a message from server 122 that his repaired mobile communicator 100 is now available at his preferred pickup location. It is appreciated that the message may be, for example, an email message or an SMS message sent to the customer's replacement mobile communicator 162.

Thereafter, such as at 10:00 AM, the customer arrives at depot 182 and identifies himself to depot 182 by entering his mobile communicator telephone number and a unique identifier, such as the last four digits of his credit card. The customer is then prompted to select a service option, and proceeds to select the Retrieve Repaired Telephone service.

Thereafter, as shown in FIG. 5B, the customer is prompted by depot 182 to return replacement mobile communicator 162 and accessory kit 164. The customer then preferably proceeds to place replacement mobile communicator 162 into receiving receptacle 104 and accessory kit 164 into bin 166.

Depot 182 then preferably notifies the customer that the returned equipment is being processed.

Reference is now made to FIGS. 6A, 6B, 6C and 6D, which together are a simplified illustration of replacement mobile communicator acceptance, validation and depersonalization functionality and customer's mobile communicator repersonalization and dispensing functionality in accordance with a preferred embodiment of the present invention.

As shown in FIG. 6A, depot 182 preferably includes functionality for confirming that replacement mobile communicator 162 is placed in receptacle 104 with its screen 106 facing upwards, and also includes a camera 108 for photographing the top surface of mobile communicator 162. It is appreciated that photographing of replacement mobile communicator 162 by camera 108 is operative to ascertain that mobile communicator 162 is not significantly damaged.

Robotic mechanism 110 is preferably employed for initially repositioning the receptacle 104 containing replacement mobile communicator 162 from its initial position, shown in FIG. 5B, at which the customer placed replacement mobile communicator 162 therein, to a second position, shown in FIG. 6A at which the top surface of replacement mobile communicator 162 is photographed by camera 108. Preferably, the replacement mobile communicator 162 is verified by depot 182 to be identical to the replacement mobile communicator originally dispensed to the customer in the illustrations of FIGS. 3A-3G, for example by scanning the IMEI identifier of replacement mobile communicator 162 and comparing the scanned IMEI identifier to the IMEI identifier of the replacement mobile communicator originally dispensed to the customer, as stored on server 122.

Robotic mechanism 110 then preferably removes replacement mobile communicator 162 from receptacle 104 and disposes replacement mobile communicator 162 into one of bins 186 located in a replacement communicator storage and transport structure 188. Each of bins 186 is preferably identified by a barcode 190. Barcode scanner 118 which is preferably mounted on robotic mechanism 110 is preferably employed for reading the barcode of bin 186 in which replacement mobile communicator 162 is disposed, for recording the identity of the bin 186 and for associating the identity of bin 186 with the identifier of replacement mobile communicator 162 in a computerized database.

Thereafter, as shown in FIG. 6B, accessory kit 164 is preferably retrieved from bin 166 by a second robotic arm 190. Upon completing the retrieval of replacement mobile communicator 162 and accessory kit 164 from receptacle 104 and bin 166, depot 182 preferably communicates with server 122 and requests deactivation of replacement mobile communicator 162 and reactivation of mobile communicator 100 in association with the customer's mobile communicator telephone number. It is appreciated that, as described hereinabove with reference to FIG. 4D, the customer's mobile communicator telephone number is associated by server 122 with mobile communicator 100 and is therefore sufficient to uniquely identify mobile communicator 100.

As yet further shown in FIG. 6B, responsive to the communication from depot 182, server 122 deactivates replacement mobile communicator 162 and activates mobile communicator 100 in association with the customer's mobile communicator telephone number. Preferably, server 122 also provides the identifier of the specific bin 174 in storage and transport structure 180 which contains repaired mobile communicator 100. It is appreciated that upon deactivation of replacement mobile communicator 162, depot 182 may ascertain whether the customer has stored new data on replacement mobile communicator 162 during the period of time in which he was in possession of replacement mobile communicator 162, and may transfer the new data to mobile communicator 100 upon activation of mobile communicator 100.

Thereafter, as shown in FIG. 6C, barcode scanner 118, which is preferably mounted on robotic mechanism 110, is employed to identify and locate bin 174 by its barcode identifier 178, which identifier 178 was provided by server 122 to 182 as identifying the bin in which repaired mobile communicator 100 is disposed.

Upon locating bin 174, robotic mechanism 110 is preferably employed to retrieve repaired mobile communicator 100 from bin 174 and to deposit repaired mobile communicator 100 into receptacle 104, and to thereafter reposition receptacle 104 to a position which is accessible to the customer. As further shown in FIG. 6C, the customer is then prompted by depot 182 to retrieve his repaired mobile communicator from receptacle 104.

Turning now to FIG. 6D, it is shown that upon retrieving his repaired mobile communicator 100 from receptacle 104, the customer verifies that mobile communicator 100 is in working condition and that his contact list is present on communicator 100.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A method for operating an automatic mobile communicator depot, the method comprising:
providing an automatic mobile communicator depot, said automatic mobile communicator depot including a mobile communicator dispenser configured to dispense mobile communicators in response to mobile communicator dispensing instructions;
receiving, from a specific customer, customer inputs identifying a specific mobile communicator with said specific customer; and
responsive at least to said customer inputs:
providing, utilizing said automatic mobile communicator depot, dispensing instructions to said mobile communicator dispenser to dispense said specific mobile communicator to said specific customer; and
automatically assigning, utilizing said automatic mobile communicator depot, a telephone number of said specific customer to said specific mobile communicator to be dispensed by said mobile communicator dispenser to said specific customer; and
automatically dispensing to said specific customer, utilizing said mobile communicator dispenser, said specific mobile communicator.

2. A method for operating an automatic mobile communicator depot according to claim 1 and wherein said customer inputs comprise at least a telephone number of said specific mobile communicator.

3. A method for operating an automatic mobile communicator depot according to claim 1 and also comprising capturing an image of at least part of said specific mobile communicator.

4. A method for operating an automatic mobile communicator depot according to claim 1 and also comprising communicating between said depot and at least one mobile communicator service center.

5. A method for operating an automatic mobile communicator depot according to claim 4 and wherein said communicating comprises communicating at least some of said customer inputs to said at least one mobile communicator service center.

6. A method for operating an automatic mobile communicator depot according to claim 5 and also comprising placing said specific mobile communicator into a bin located within a mobile communicator storage and transport structure.

7. A method for operating an automatic mobile communicator depot according to claim 6 and wherein said communicating comprises communicating the identities of said bin and of said mobile communicator storage and transport structure to said at least one mobile communicator service center in association with a unique identifier of said specific mobile communicator.

8. A method for operating an automatic mobile communicator depot according to claim 7 and wherein at least part of said identities of said bin and of said mobile communicator storage and transport structure are encoded in barcodes imprinted on respective ones of said bin and said mobile communicator storage and transport structure.

9. A method for operating an automatic mobile communicator depot according to claim 6 and wherein said mobile communicator storage and transport structure is operable for removal thereof from said depot and for transport between said depot and said mobile communicator service center.

10. A method for operating an automatic mobile communicator depot according to claim 1 and wherein:
    said automatic mobile communicator depot also includes a mobile communicator acceptor;
    the method also comprises accepting, utilizing said mobile communicator acceptor, mobile communicators and providing, utilizing said automatic mobile communicator depot, mobile communicator acceptance inputs;
    said specific mobile communicator comprises a specific substitute mobile communicator; and
    said automatically assigning comprises automatically transferring, utilizing said automatic mobile communicator depot, a telephone number from a mobile communicator received by said mobile communicator acceptor from said specific customer to said substitute mobile communicator dispensed by said mobile communicator dispenser to said specific customer.

11. A method for operating an automatic mobile communicator depot according to claim 10 and wherein:
    said accepting mobile communicators comprises accepting from a customer a mobile communicator to be repaired; and
    said dispensing substitute mobile communicators comprises dispensing to said customer a temporary replacement mobile communicator to be used until the customer's mobile communicator is returned in a repaired state to the customer.

12. A method for operating an automatic mobile communicator depot according to claim 11 and wherein:
    said accepting mobile communicators comprises accepting from said customer said temporary replacement mobile communicator; and
    said dispensing substitute mobile communicators comprises dispensing said mobile communicator earlier received from said customer, to said customer in a repaired state.

13. A method for operating an automatic mobile communicator depot according to claim 11 and wherein said transferring comprises automatically transferring said telephone number from said temporary replacement mobile communicator received from said customer to said mobile communicator dispensed to said customer in a repaired state.

14. A method for operating an automatic mobile communicator depot according to claim 11 and also comprising automatically transferring data stored in a mobile communicator received from said customer to said temporary replacement mobile communicator dispensed to said customer.

15. A method for operating an automatic mobile communicator depot according to claim 14 and wherein said data comprises at least part of a contact list.

16. A method for operating an automatic mobile communicator depot according to claim 14 and wherein said transferring of data is achieved at least partly by utilizing wireless communication.

17. A method for operating an automatic mobile communicator depot according to claim 14 and also comprising automatically transferring data stored in said temporary substitute mobile communicator earlier received from said given customer to said mobile communicator dispensed to said customer in a repaired state.

18. A method for operating an automatic mobile communicator depot according claim 11 and also comprising automatically transferring data of a given customer, said data stored in an internet accessible storage facility, to said temporary substitute mobile communicator dispensed to said customer.

19. A method for operating an automatic mobile communicator depot according to claim 18 and wherein said data comprises at least part of a contact list.

20. A method for operating an automatic mobile communicator depot according to claim 18 and wherein said transferring of data is achieved at least partly by utilizing wireless communication.

21. A method for operating an automatic mobile communicator depot according to claim 11 and wherein said customer inputs comprise at least a description of a malfunction of said specific mobile communicator which needs to be repaired and a preferred future pickup location of said specific mobile communicator in a repaired state.

22. A method for operating an automatic mobile communicator depot according to claim 11 and also comprising notifying said customer that his mobile communicator has been repaired and will be available for pickup at a specific automatic mobile communicator depot at a specific time.

23. A method for operating an automatic mobile communicator depot according to claim 11 and also comprising notifying said customer that his mobile communicator has been repaired and is available for pickup at a specific automatic mobile communicator depot.

24. A method for operating an automatic mobile communicator depot according to claim 10 and wherein:
    said accepting mobile communicators comprises accepting from a customer a mobile communicator to be replaced; and
    said dispensing substitute mobile communicators comprises dispensing to said customer a permanent replacement mobile communicator.

25. A method for operating an automatic mobile communicator depot according to claim 10 and wherein said receiving customer inputs comprises receiving customer inputs identifying a specific mobile communicator with a specific customer via the internet.

26. A method for operating an automatic mobile communicator depot according to claim 10 and also comprising:
    dispensing, to said customer, utilizing said mobile communicator dispenser, mobile communicator accessories suitable for use with said substitute mobile communicators to be used until the customer's mobile communicator is returned in a repaired state to the customer; and accepting, from said customer, utilizing said mobile communicator acceptor, said mobile communicator accessories earlier dispensed to said customer, upon return of said customer's mobile communicator in a repaired state to the customer.

27. A method for operating an automatic mobile communicator depot according to claim 26 and wherein said accessories comprise at least one of a mobile communicator charger and a data synchronizing cable.

* * * * *